US012687248B2

(12) United States Patent
Howard

(10) Patent No.: US 12,687,248 B2
(45) Date of Patent: Jul. 21, 2026

(54) FLUID CONDUIT ASSEMBLY

(71) Applicant: GALL THOMSON ENVIRONMENTAL LIMITED, Tewkesbury (GB)

(72) Inventor: Stuart Andrew Howard, Lowestoft Suffolk (GB)

(73) Assignee: Gall Thompson Environmental Limited, Tewkesbury (GB)

( * ) Notice: Subject to any disclaimer, the term of this patent is extended or adjusted under 35 U.S.C. 154(b) by 349 days.

(21) Appl. No.: 17/631,349

(22) PCT Filed: Jul. 29, 2020

(86) PCT No.: PCT/GB2020/051814
§ 371 (c)(1),
(2) Date: Jan. 28, 2022

(87) PCT Pub. No.: WO2021/019236
PCT Pub. Date: Feb. 4, 2021

(65) Prior Publication Data
US 2022/0268381 A1 Aug. 25, 2022

(30) Foreign Application Priority Data
Jul. 30, 2019 (GB) ..................................... 1910838

(51) Int. Cl.
*F16L 29/04* (2006.01)
*F16L 29/02* (2006.01)
(Continued)

(52) U.S. Cl.
CPC .............. *F16L 29/04* (2013.01); *F16L 29/02* (2013.01); *F16L 37/32* (2013.01); *F16L 37/33* (2013.01);
(Continued)

(58) Field of Classification Search
CPC ... F16L 29/04; F16L 55/1007; F16L 55/1015; F16L 37/36; F16L 37/34; F16L 37/35; F16L 37/33; F16L 37/32
See application file for complete search history.

(56) References Cited

U.S. PATENT DOCUMENTS

| | | | | | |
|---|---|---|---|---|---|
| 569,668 | A | * | 10/1896 | Pinckert | F16L 37/32 |
| | | | | | 137/614.02 |
| 2,505,093 | A | * | 4/1950 | Hudson | F16L 29/04 |
| | | | | | 137/614.04 |

(Continued)

FOREIGN PATENT DOCUMENTS

| | | |
|---|---|---|
| CN | 105179772 | 12/2015 |
| CN | 109952462 | 6/2019 |

(Continued)

OTHER PUBLICATIONS

Patent Cooperation Treaty, International Search Report and Written Opinion of the International Searching Authority issued in International Application No. PCT/GB2020/051814, Apr. 12, 2020, 11 pp.

(Continued)

*Primary Examiner* — Atif H Chaudry
(74) *Attorney, Agent, or Firm* — Fitch, Even, Tabin & Flannery LLP

(57) ABSTRACT

A fluid conduit assembly (20) comprises: first and second fluid conduits (22,24); a coupling including first and second coupling sections (26,28), each coupling section (26,28) defining a respective hollow bore along which flowable material may flow, the first coupling section (26) in fluid connection with the first fluid conduit (22), the second coupling section (28) in fluid connection with the second fluid conduit (24), the coupling sections (26,28) configured to be releasably coupled to each other; and at least one shut-off valve located within the hollow bore of at least one of the coupling sections (26,28), the or each shut-off valve (Continued)

including a valve member (32) movable between a valve open position and a valve closed position in which the valve member (32) shuts off the flow of a flowable material through the hollow bore, the or each valve member (32) configured to move to its valve closed position on separation of the coupling sections (26,28), wherein the first coupling section (26) is connected to the first fluid conduit (22) so that a first end (36) of the first coupling section (26) extends inside a hollow bore of the first fluid conduit (22) and a second end (38) of the first coupling section (26) is located outside the hollow bore of the first fluid conduit (22), and/or wherein the second coupling section (28) is connected to the second fluid conduit (24) so that a first end (40) of the second coupling section (28) extends inside a hollow bore of the second fluid conduit (24) and a second end (42) of the second coupling section (28) is located outside the hollow bore of the second fluid conduit (24).

18 Claims, 16 Drawing Sheets

(51) Int. Cl.
| | |
|---|---|
| *F16L 37/32* | (2006.01) |
| *F16L 37/33* | (2006.01) |
| *F16L 37/34* | (2006.01) |
| *F16L 37/35* | (2006.01) |
| *F16L 37/36* | (2006.01) |
| *F16L 55/10* | (2006.01) |

(52) U.S. Cl.
CPC .............. *F16L 37/34* (2013.01); *F16L 37/35* (2013.01); *F16L 37/36* (2013.01); *F16L 55/1007* (2013.01); *F16L 55/1015* (2013.01)

(56) References Cited

U.S. PATENT DOCUMENTS

| | | | |
|---|---|---|---|
| 4,326,555 | A | 4/1982 | Thomson |
| 4,625,746 | A | 12/1986 | Calvin |
| 5,293,898 | A | 3/1994 | Masloff |
| 5,699,823 | A | 12/1997 | Thomson |
| 6,269,836 | B1 | 8/2001 | Monti |
| 2005/0098753 | A1 | 5/2005 | Ozaki |
| 2009/0091129 | A1* | 4/2009 | Moriiki ................... F16L 37/32 285/321 |
| 2009/0232586 | A1* | 9/2009 | Diodati ................... F16L 37/32 403/14 |
| 2010/0117356 | A1* | 5/2010 | Pucciani ................ F16L 25/14 285/238 |
| 2013/0025713 | A1 | 1/2013 | Smith, III |
| 2016/0153595 | A1 | 6/2016 | Arvelo |
| 2019/0186666 | A1* | 6/2019 | Tandberg .............. E21B 33/038 |

FOREIGN PATENT DOCUMENTS

| | | | |
|---|---|---|---|
| GB | 491630 | A | 9/1938 |
| GB | 2076917 | | 12/1981 |
| GB | 2554692 | | 4/2018 |
| JP | 3060297 | | 8/1999 |
| WO | 2018078036 | | 5/2018 |

OTHER PUBLICATIONS

State Intellectual Property Office, Notice of First Office Action issued in International Application No. 202080059968.5, Jun. 15, 2023, 10 pp.

State Intellectual Property Office, Search Report issued in International Application No. 202080059968.5, Jun. 13, 2023, 3 pp.

N.P. Cheremisinoff, Encyclopedia of Fluid Mechanics (A Concise Handbook of Fluid Engineering: Design of Fluid Flow Processes and Devices, Cosmonautics Press) 1989, p. 48-54 (7 pp.).

Atomic Energy Press, Boiling Heat Transfer and Gas-Liquid Two-Phase Flow, edited by Xu Jiqin, 1993, pp. 1-36 (48 pp.).

Beijing Institute of Technology Press, Thermal Instrument Measurement and Regulation, edited by Ren Junying and Liu Yang, 2014, pp. 74-75 (32 pp.).

State Intellectual Property Office, Decision of Rejection received in Chinese Application No. 202080059968.5, May 31, 2024, pp. 1-12 (24 pp.).

* cited by examiner

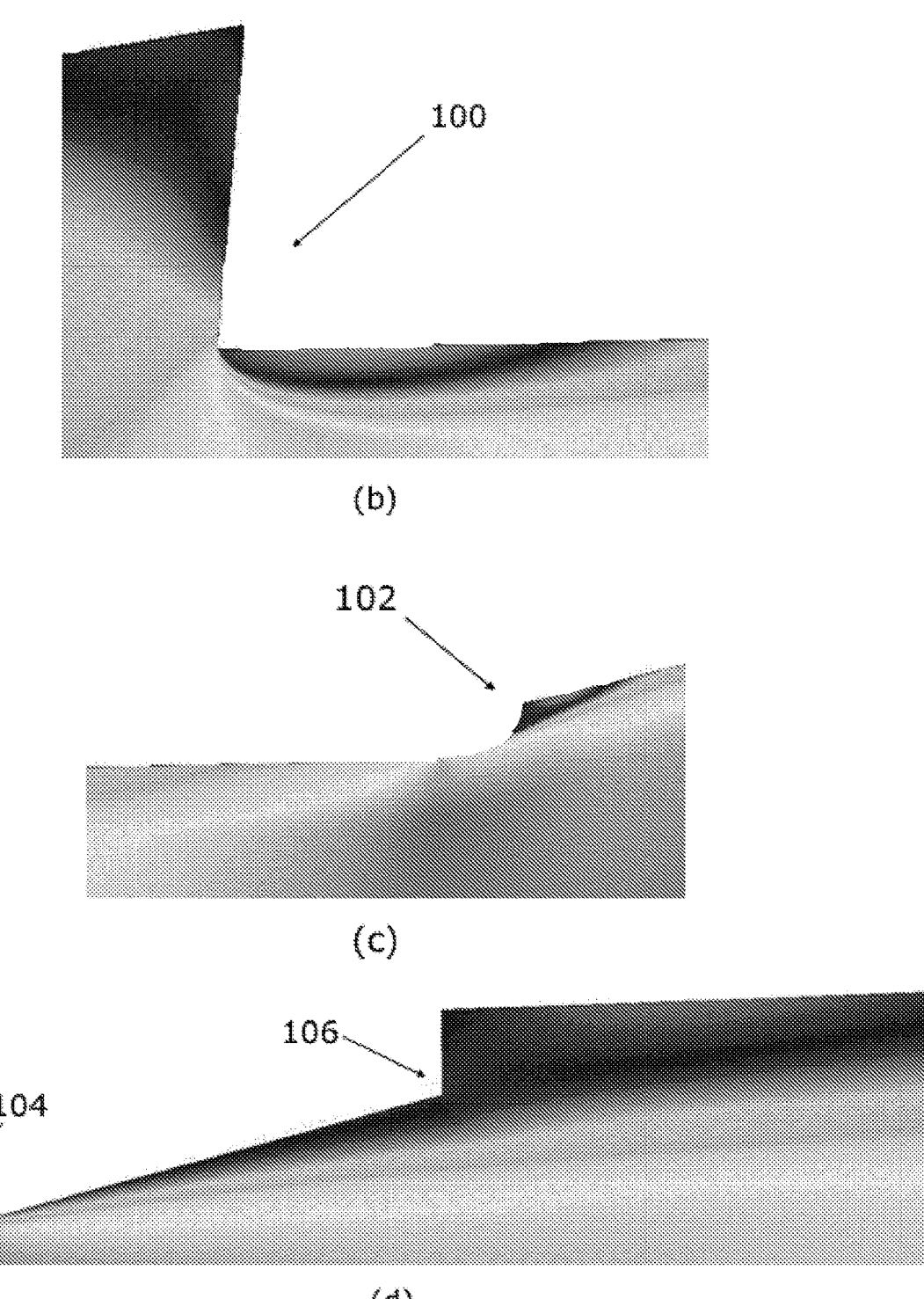
(b)
(c)
(d)
Figure 4 - continued

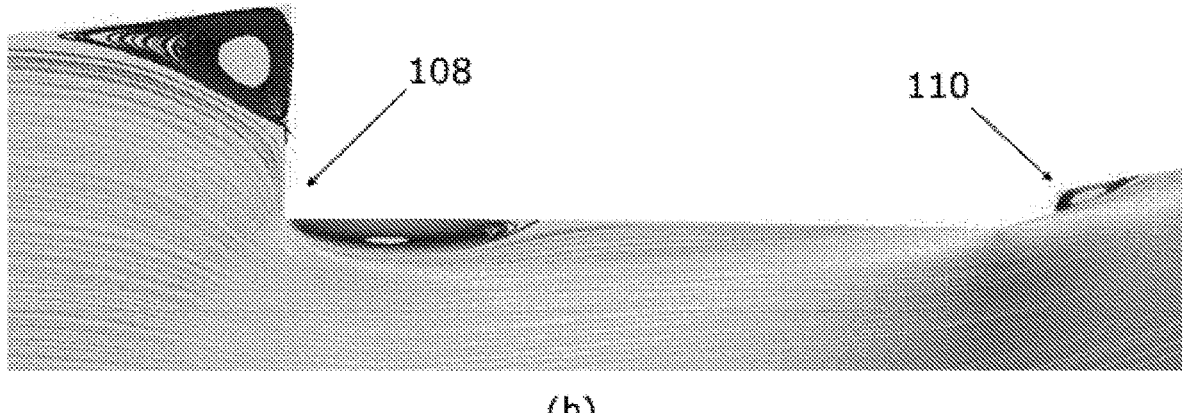
(b)
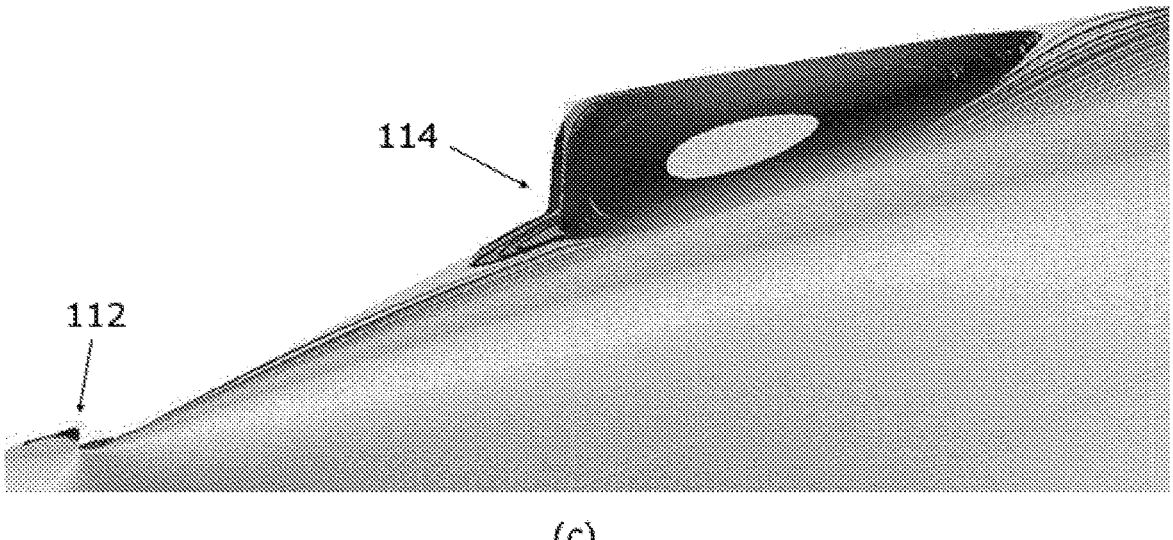
(c)
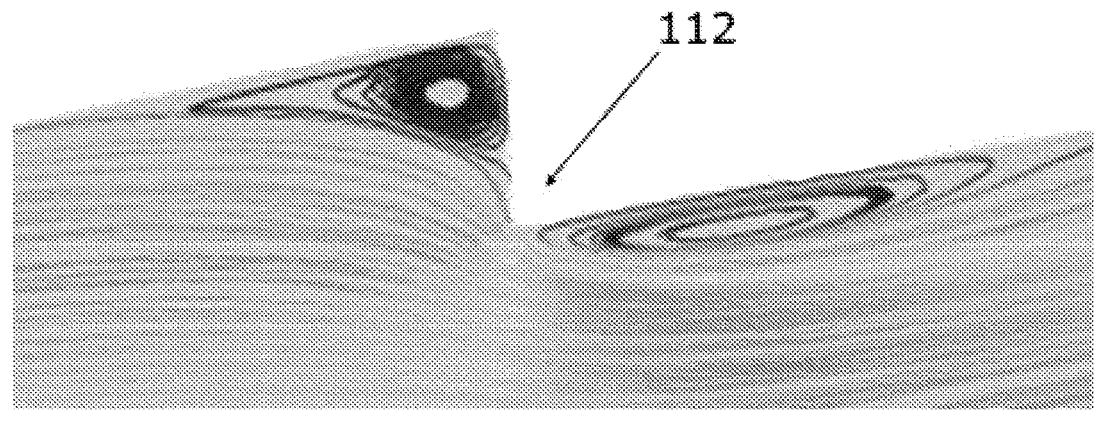
(d)
Figure 5 - continued

FLUID CONDUIT ASSEMBLY

CROSS-REFERENCE TO RELATED APPLICATIONS

This application is a U.S. national phase application filed under 35 U.S.C. § 371 of International Application No. PCT/GB2020/051814, filed Jul. 29, 2020, designating the United States, which claims priority from United Kingdom patent application No. 1910838.0, filed Jul. 30, 2019, which are hereby incorporated by reference herein in their entirety.

This invention relates to a fluid conduit assembly.

It is known to use a coupling to releasably connect two fluid conduits together.

According to an aspect of the invention, there is provided a fluid conduit assembly comprising:

first and second fluid conduits;

a coupling including first and second coupling sections, each coupling section defining a respective hollow bore along which flowable material may flow, the first coupling section in fluid connection with the first fluid conduit, the second coupling section in fluid connection with the second fluid conduit, the coupling sections configured to be releasably coupled to each other; and at least one shut-off valve located within the hollow bore of at least one of the coupling sections, the or each shut-off valve including a valve member movable between a valve open position and a valve closed position in which the valve member shuts off the flow of a flowable material through the hollow bore, the or each valve member configured to move to its valve closed position on separation of the coupling sections, wherein the first coupling section is connected to the first fluid conduit so that a first end of the first coupling section extends inside a hollow bore of the first fluid conduit and a second end of the first coupling section is located outside the hollow bore of the first fluid conduit, and/or wherein the second coupling section is connected to the second fluid conduit so that a first end of the second coupling section extends inside a hollow bore of the second fluid conduit and a second end of the second coupling section is located outside the hollow bore of the second fluid conduit.

In use, the fluid conduit assembly transports a fluid from one location to another location. Such fluids include liquids and gases, particularly liquid natural gas, petrochemicals and hydrocarbons. The provision of the coupling in the fluid conduit assembly enables the fluid conduits to be readily disconnected from each other by releasably decoupling the coupling sections from each other. The disconnection of the fluid conduits may take place under normal operating conditions (such as completion of a fluid transfer process) or under emergency operating conditions (such as the fluid conduits being exposed to unexpected loads beyond its allowable load rating).

The configuration of the first end of at least one of the first and second coupling sections to extend inside the hollow bore of the corresponding fluid conduit allows for a reduction in effective length of the coupling, i.e. the length of the coupling between the fluid conduits, and at the same time maintain the actual length of the coupling required to accommodate the structure and/or operation of the or each shut-off valve.

In addition, the configuration of the first end of at least one of the first and second coupling sections to extend inside the hollow bore of the corresponding fluid conduit enables the fluid conduits to form an outer housing that encloses part of the coupling, which reduces the amount and cost of material required to construct the coupling. This allows for a reduction in overall size and weight of the coupling, which not only makes it easier to handle the coupling during installation and after separation of the coupling sections but also diminishes the risk of auto-submergence of the ends of the fluid conduits after separation of the coupling sections.

The configuration of the fluid conduit assembly of the invention therefore enables the construction of a smaller and lighter coupling without adversely affecting the coupling's capability to block the flow of the flowable material through the hollow bore upon separation of the coupling sections.

Furthermore, the configuration of the first end of at least one of the first and second coupling sections to extend inside the hollow bore of the corresponding fluid conduit not only enhances the robustness of the connection of the coupling to the fluid conduits, but also enables the fluid conduits to form an outer housing that encloses part of the coupling to provide protection for the coupling, particularly its internal features, from accidental damage and the environment.

Moreover, the reduction in the effective length of the coupling decreases the amount of bending moment experienced by the coupling during use of the fluid conduit assembly. This is particularly applicable to the use of the fluid conduit assembly in reeling applications, such as reeling of the fluid conduit assembly around a reel or unreeling of the fluid conduit assembly from the reel, which can generate bending moments resulting in tensile loads beyond an allowable tensile load rating.

In contrast, configuring the coupling sections to be located completely outside the hollow bores of the respective fluid conduits results in a coupling with a longer effective length than the coupling of the invention. This is because the effective length of the coupling would be equal to the actual length of the coupling that is required to accommodate the structure and/or operation of the or each shut-off valve. A fluid conduit assembly comprising such a coupling would not have the aforementioned benefits of the fluid conduit assembly of the invention.

The or each first end may have a tapered bore profile that tapers in a direction towards the corresponding second end. Preferably the tapered bore profile defines a section of a hollow bore of the corresponding first end that is furthest inside the hollow bore of the corresponding fluid conduit.

Flow separation (also known as flow detachment) takes place at the transition between different bore widths in the fluid conduit assembly, primarily the transition between the bore of the fluid conduit and the narrower bore of the inserted first end of the corresponding coupling section. This creates localized flow recirculation zones with eddies that contribute to higher energy loss and increased pressure drop in the flow of the flowable material.

The provision of a tapered bore profile of the or each first end minimizes or delays flow separation, enables quicker flow reattachment and suppresses the size of the flow recirculation zones and associated eddies to reduce energy loss and pressure drop and achieve faster pressure recovery. This is due to the tapered bore profile streamlining the shape of the bore to provide a less abrupt change of bore geometry.

In such embodiments, the tapered bore profile may be a straight tapered bore profile. In other such embodiments, the tapered bore profile may be a curved tapered bore profile, such as a convex tapered bore profile.

Both straight tapered and curved tapered bore profiles provide reliable means for improving the flow performance of the fluid conduit assembly by minimizing or delaying flow separation, enabling quicker flow reattachment and suppressing the size of the flow recirculation zones and associated eddies. In particular, the curved tapered bore profile offers a more gradual change of bore geometry in comparison to the straight tapered bore profile. This enables quicker flow reattachment for pressure recovery at the inlet of the coupling but also results in flow separation taking place nearer the outlet of the coupling, which results in shorter pressure recovery zones that are defined by the distance between the flow separation and reattachment locations.

In embodiments of the invention, the coupling may have a continuous, smooth bore profile that extends or substantially extends throughout the hollow bores of the coupling sections. This prevents any abrupt (i.e. discontinuous) change of bore geometry along the axis of the hollow bore and thereby further enhances the flow performance of the fluid conduit assembly.

In embodiments of the invention in which each of the first and second coupling sections includes a respective first end, an axial length of the tapered bore profile of the first end of one of the first and second coupling sections may be shorter than an axial length of the tapered bore profile of the first end of the other of the first and second coupling sections. The axial lengths of the tapered bore profiles of the first ends may be optimized to balance the fluid conduit assembly's performance against the coupling's cost and weight.

Preferably one of the first and second coupling sections may be configured as an upstream coupling section, the other of the first and second coupling sections may be configured as a downstream coupling section, and an axial length of the tapered bore profile of the first end of the upstream coupling section may be shorter than an axial length of the tapered bore profile of the first end of the downstream coupling section.

Shortening the axial length of the tapered bore profile of the first end of the upstream coupling section allows for reductions in the cost and weight of the coupling without significantly impacting on the overall flow performance, particularly pressure drop. Meanwhile the axial length of the tapered bore profile of the first end of the downstream coupling section can be configured to be longer to minimize or delay flow separation and suppress the size of the flow recirculation zones in order to improve the overall flow performance.

In further embodiments of the invention in which each of the first and second coupling sections includes a respective first end, one of the first and second coupling sections may be configured as an upstream coupling section, the other of the first and second coupling sections may be configured as a downstream coupling section, and a width of a hollow bore of the first end of the upstream coupling section may be larger than a width of a hollow bore of the first end of the downstream coupling section.

Increasing the width of the hollow bore of the first end of the upstream coupling section results in a smaller flow impingement zone at the inlet of the coupling, which in turn results in a lower pressure drop.

Alternatively the or each first end may have a straight bore profile.

The length of the or each first end extending inside the hollow bore of the corresponding fluid conduit may be between 10% and 90% of the total length of the corresponding coupling section, preferably between 20% and 80% of the total length of the corresponding coupling section, between 30% and 70% of the total length of the corresponding coupling section, between 40% and 60% of the total length of the corresponding coupling section, or 50% of the total length of the corresponding coupling section.

The invention is applicable to a wide range of shut-off valves, the structure and configuration of which may vary to optimize the design of the coupling in terms of, for example, its effective length, its size, its weight, and protection for the coupling. Examples of such shut-off valves are described as follows and elsewhere in this specification.

In embodiments of the invention, at least part of the or each shut-off valve may be arranged to be inside the first end of the corresponding coupling section. In such embodiments, at least part of the or each shut-off valve may be arranged to be inside the first end of the corresponding coupling section when the corresponding valve member is in its valve open position, and/or at least part of the or each shut-off valve may be arranged to be inside the first end of the corresponding coupling section when the corresponding valve member is in its valve closed position.

By arranging part or the whole of the or each shut-off valve to be inside the first end of the corresponding coupling section, it becomes possible to further reduce the effective length of the coupling without compromising on the capability of the or each shut-off valve to shut off the flow of a flowable material through the hollow bore. In addition, arranging part or the whole of the or each shut-off valve to be inside the first end of the corresponding coupling section provides additional protection for the or each shut-off valve from accidental damage and the environment.

The or each valve member in its valve open position may be located in any one of: the first end of the corresponding coupling section; the second end of the corresponding coupling section; and both of the first and second ends of the corresponding coupling section.

When the or each valve member in its valve open position is located in any one of: the first end of the corresponding coupling section; and both of the first and second ends of the corresponding coupling section, at least part of the or each valve member in its valve open position may extend into the corresponding fluid conduit beyond the first end of the corresponding coupling section.

The or each valve member in its valve closed position may be located in any one of: the first end of the corresponding coupling section: the second end of the corresponding coupling section; and both of the first and second ends of the corresponding coupling section.

The location of the or each valve member in the corresponding first end and/or second end depends on the structure and operation of the or each valve member, and may be configured to not only optimize the effective length of the coupling but also provide a desired level of protection for the or each valve member from accidental damage and the environment.

The or each shut-off valve may include a pivot member pivotally mounted to the corresponding coupling section, the valve member of the or each shut-off valve being pivotally movable relative to the hollow bore of the corresponding coupling section via the corresponding pivot member.

The or each pivot member may be pivotally mounted to an inner wall of the corresponding coupling section. Mounting the or each pivot member in this manner increases bore clearance to minimize any reduction in flow performance arising from the insertion of the first end inside the hollow bore of the corresponding fluid conduit.

In a preferred embodiment of the invention, the or each shut-off valve may include a plurality of petal elements. Each petal element may have a pivot member and a valve member. The valve member of each petal element may be pivotally movable relative to the hollow bore of the corresponding coupling section via the corresponding pivot member. Each petal element may be rotatable between a fully retracted position that corresponds to a valve open position of the corresponding shut-off valve and a fully extended position that corresponds to a valve closed position of the corresponding shut-off valve. The valve members may be configured so that, when the corresponding shut-off valve is in the valve closed position, the valve members may abut one another to form a cone that faces or opposes a direction of flow of the flowable material. An apex of the cone may define a meeting point for the petal elements when the corresponding shut-off valve is in the valve closed position.

The petal configuration of the or each shut-off valve helps to minimize any reduction in flow performance arising from the insertion of the first end inside the hollow bore of the corresponding fluid conduit. This is because a shut-off valve having a plurality of petal elements may provide substantial bore clearance in the valve open position while being capable of securely blocking the flow of the flowable material in the valve closed position.

Moreover, the configuration of the petal elements are such that, when the shut-off valve is in its closed position, the abutting valve members may be located in any one of: the first end of the corresponding coupling section; the second end of the corresponding coupling section; and both of the first and second ends of the corresponding coupling section.

The pivot member may be located in any one of: the first end of the corresponding coupling section; the second end of the corresponding coupling section; and both of the first and second ends of the corresponding coupling section.

The location of the or each pivot member in the corresponding first end and/or second end depends on the structure and operation of the or each pivot member, and may be configured to not only optimize the effective length of the coupling but also provide a desired level of protection for the or each pivot member from accidental damage and the environment.

The invention is applicable to a wide range of fluid conduits, the structure and configuration of which may vary. Examples of such fluid conduits are described as follows and elsewhere in this specification.

In a first example, each of the first and second fluid conduits may be a flexible fluid conduit, such as a hose.

In a second example, each of the first and second fluid conduits may be a rigid fluid conduit, such as a pipeline.

In a third example, one of the first and second fluid conduits may be a flexible fluid conduit, and the other of the first and second fluid conduits may be a rigid fluid conduit.

The invention is applicable for use with both flexible and rigid fluid conduits. Both types of fluid conduits, particularly the rigid type, provide additional protection for the or each first end of the coupling housed within the hollow bore of the corresponding fluid conduit. The invention is useful for flexible fluid conduits that are more susceptible to bending moments, particularly in reeling applications.

In embodiments of the invention, the or each first end may be dimensioned to fit the hollow bore of the corresponding fluid conduit into which it extends. The term "fit", as used here and elsewhere in this specification, is intended to refer to the outer dimensions (such as outer diameter) of the or each first end matching the inner dimensions (such as inner diameter) of the hollow bore of the corresponding fluid conduit, subject to manufacturing tolerances.

Alternatively an intermediate element, such as a collar or a sealing element, may be arranged between the or each first end and an inner wall of the corresponding fluid conduit.

An outer wall of the or each first end may be a non-threaded outer wall, a protrusion-free outer wall, a groove-free outer wall and/or a smooth outer wall.

The or each second end may include a flange that is secured to a flange of the corresponding fluid conduit to which the corresponding coupling section is connected. This further improves the security of the connection of the coupling to the fluid conduits. The flanges may be secured together using at least one flange fastener. For example, the or each flange fastener may include: a screw fastener; a nut and bolt arrangement; a collar for securing the flanges together; or a clamping device for securing the flanges together.

Using a flanged joint to secure the coupling section and fluid conduit together is beneficial over a screwed or threaded joint, especially in reeling applications, in that it not only reduces the amount of bending moment experienced by the coupling as a result of the screwed or threaded joint but also avoids damage to an inner wall of the hollow bore of the fluid conduit arising from bending at the screwed or threaded joint. In addition, it is simpler and cheaper to repair or replace a damaged component of the flanged joint than it is to repair or replace a screwed or threaded surface that is an integral part of the coupling section. Furthermore, particularly for large and heavy fluid conduit assemblies, the flanged joint makes it easier to attach and detach the coupling section from the fluid conduit in comparison to a screwed or threaded joint that requires rotation of the coupling section.

The coupling sections may be releasably coupled to each other via at least one releasable fastener. The or each releasable fastener may include a weakened portion that breaks on exposure to a tensile load exceeding a predetermined limit. Such a releasable fastener may be in the form of, for example, a breakstud. This provides a reliable means of releasing the or each releasable fastener to cause the automatic separation of the coupling sections in response to the coupling being exposed to a tensile load exceeding an allowable tensile load rating.

Other examples of releasable fasteners that can be used in the invention include, for example, a collar or a clamping device for securing the coupling sections together. In addition, or alternatively, the or each releasable fastener may be configured to permit controlled separation of the coupling sections from each other on operation of an actuation mechanism (e.g. a hydraulic or pneumatic actuation mechanism) operably engaged with the or each releasable fastener.

The coupling sections may be directly secured to each other. For example, the coupling sections may have adjacent portions (e.g. flanges) that are directly secured to each other.

Alternatively, the coupling sections may be indirectly secured to each other. For example, the coupling may further include an additional coupling section, such as a collar-shaped coupling section, arranged between the coupling sections, where the coupling sections are secured to each other via the intermediate additional coupling section.

The fluid conduit assembly may include: a first shut-off valve located within the hollow bore of the first coupling section; and a second shut-off valve located within the hollow bore of the second coupling section. The benefits of the invention arising from a reduction in the effective length of the coupling is more apparent for a fluid conduit assembly having a coupling comprising multiple shut-off valves.

The or each valve member may be biased to move to its valve closed position on separation of the coupling sections. Alternatively the or each valve member may be controllable, e.g. using an actuation mechanism, to move to its valve closed position on separation of the coupling sections.

The configuration of the coupling of the invention may accommodate different ways of moving the or each valve member to its valve closed position.

In embodiments of the invention, the coupling may be a breakaway coupling or a release coupling.

Breakaway and release couplings are used in situations where a fluid conduit (e.g. a pipeline) may be exposed to a tensile loading which, in the absence of a breakaway or release coupling, could cause the fluid conduit to fracture. Typically, such a fluid conduit may be one used for carrying material (e.g. liquid or gas) between two locations, such as between ships or between a ship and a stationary site (e.g. a dock). If such a fracture occurs, the material being conveyed along the fluid conduit flows freely out of the fractured ends of the fluid conduit. This can cause significant spillage that is expensive to clear and may be environmentally undesirable. The presence of a breakaway or release coupling enables the fluid conduit to fracture at a specified location (i.e. at the coupling) and for spillage to be avoided by providing one or more valves in the breakaway coupling which are actuated when the coupling breaks.

The configuration of the coupling of the invention is particularly beneficial when the coupling is in the form of a breakaway coupling or a release coupling. For the same reasons outlined earlier in this specification, the configuration of the coupling of the invention provides the breakaway or release coupling with several advantages over conventional breakaway or release couplings by reducing their size, weight and cost, improving their handling, reducing the risk of post-separation auto-submergence, and providing additional protection.

It will be understood that the use of the terms "first" and "second" and the like in this specification is merely intended to help distinguish between similar features (e.g. the first and second fluid conduits, the first and second coupling sections, and so on), and is not intended to indicate the relative importance of one feature over another feature.

Preferred embodiments of the invention will now be described, by way of non-limiting examples, with reference to the accompanying drawings in which:

FIG. 1 shows schematically a fluid conduit assembly according to a first embodiment of the invention;

FIGS. 2 and 3 respectively show the fluid conduit assembly of FIG. 1 when the shut-off valve housings are connected and separated;

Figure 13:
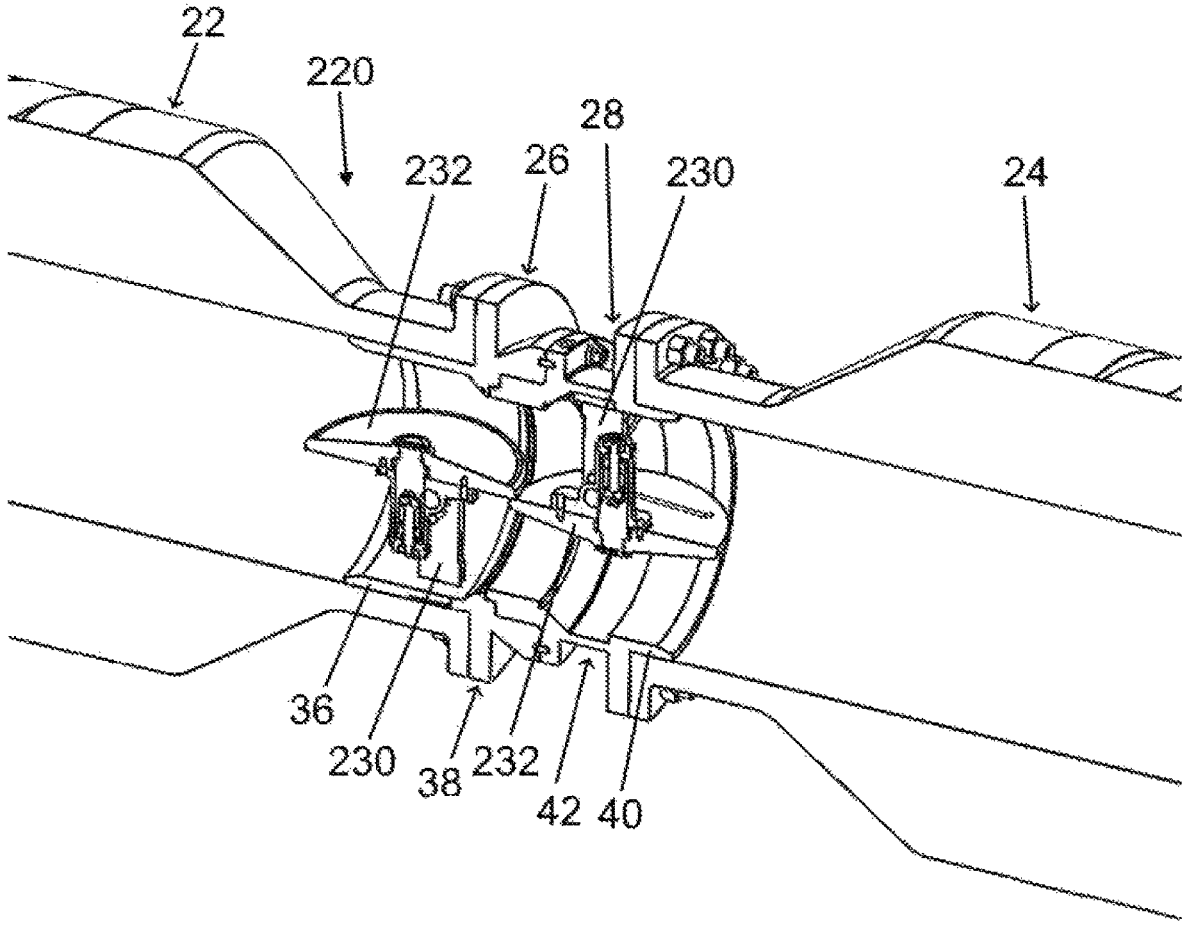
FIG. 13 shows schematically a fluid conduit assembly according to a second embodiment of the invention.
Figure 14:
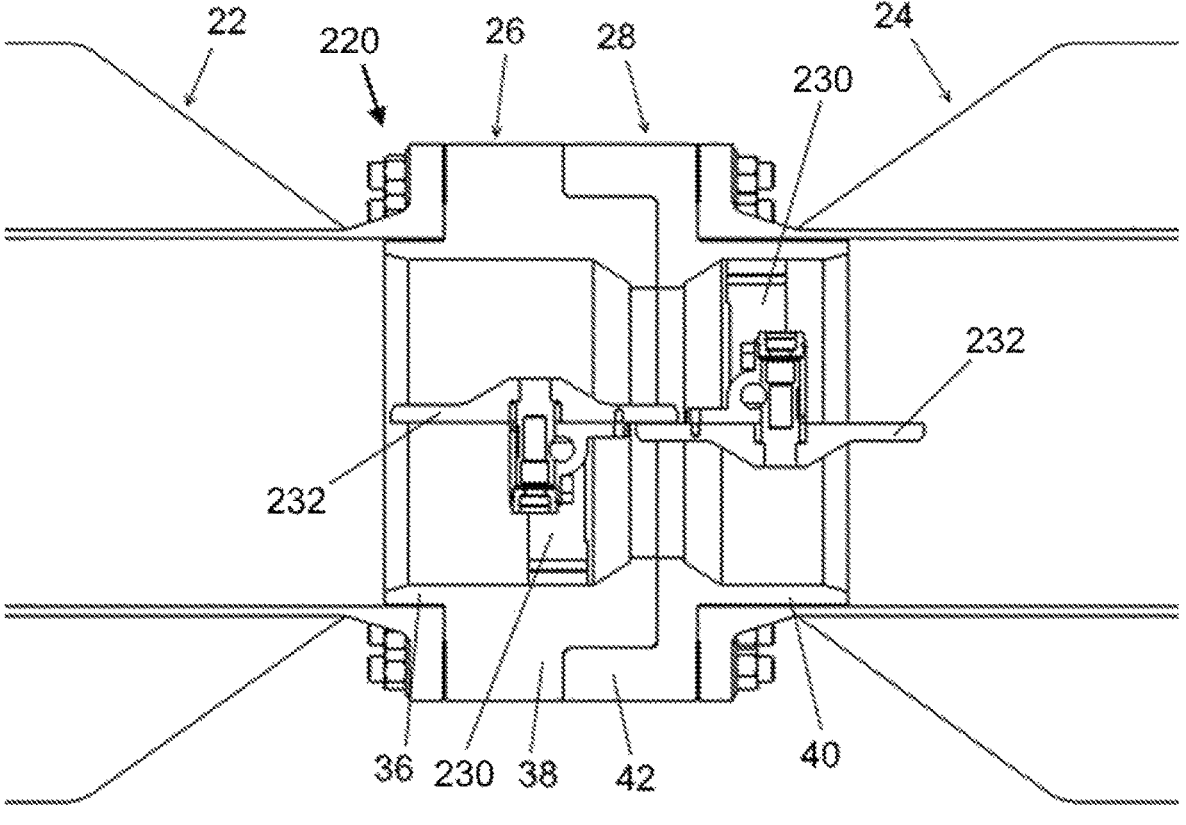
Figure 15:
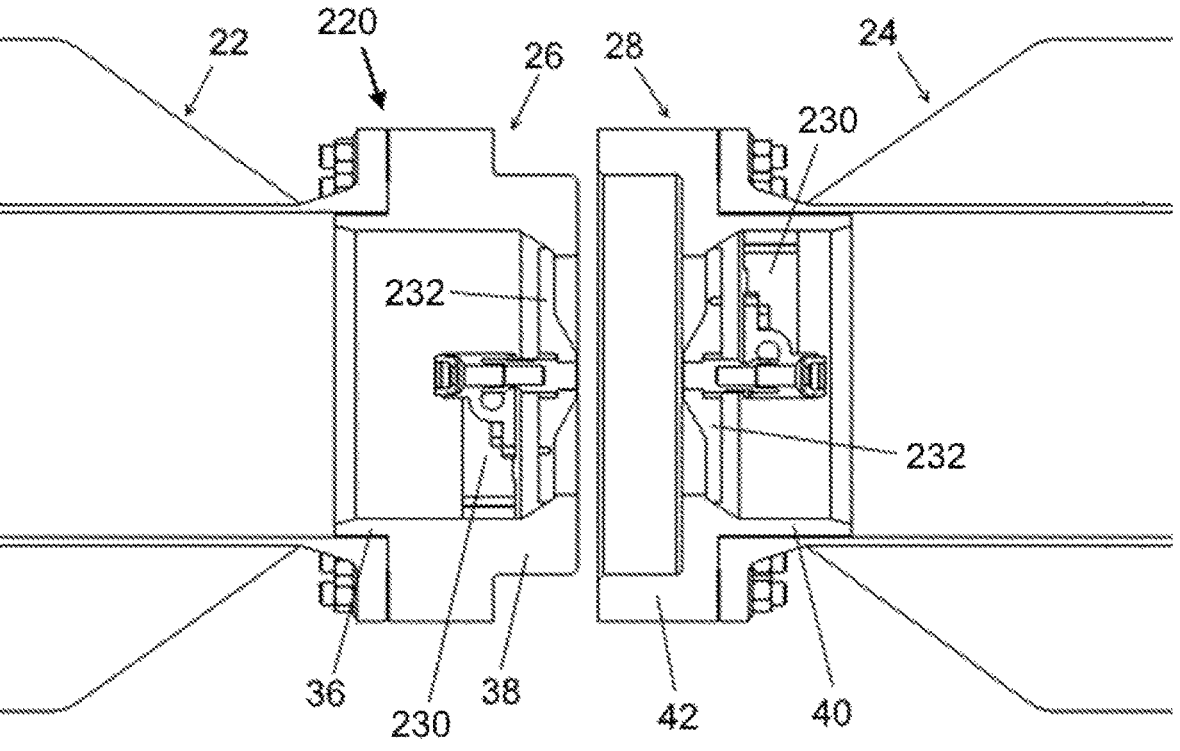

FIGS. 14 and 15 respectively show the fluid conduit assembly of FIG. 13 when the shut-off valve housings are connected and separated.

The figures are not necessarily to scale, and certain features and certain views of the figures may be shown exaggerated in scale or in schematic form in the interests of clarity and conciseness.

The following embodiments of the invention are described with reference to a breakaway coupling configured to releasably connect two flexible hoses together, but it will be appreciated that the following embodiments of the invention are applicable mutatis mutandis to other types of couplings and other types of fluid conduits.

Figure 1:
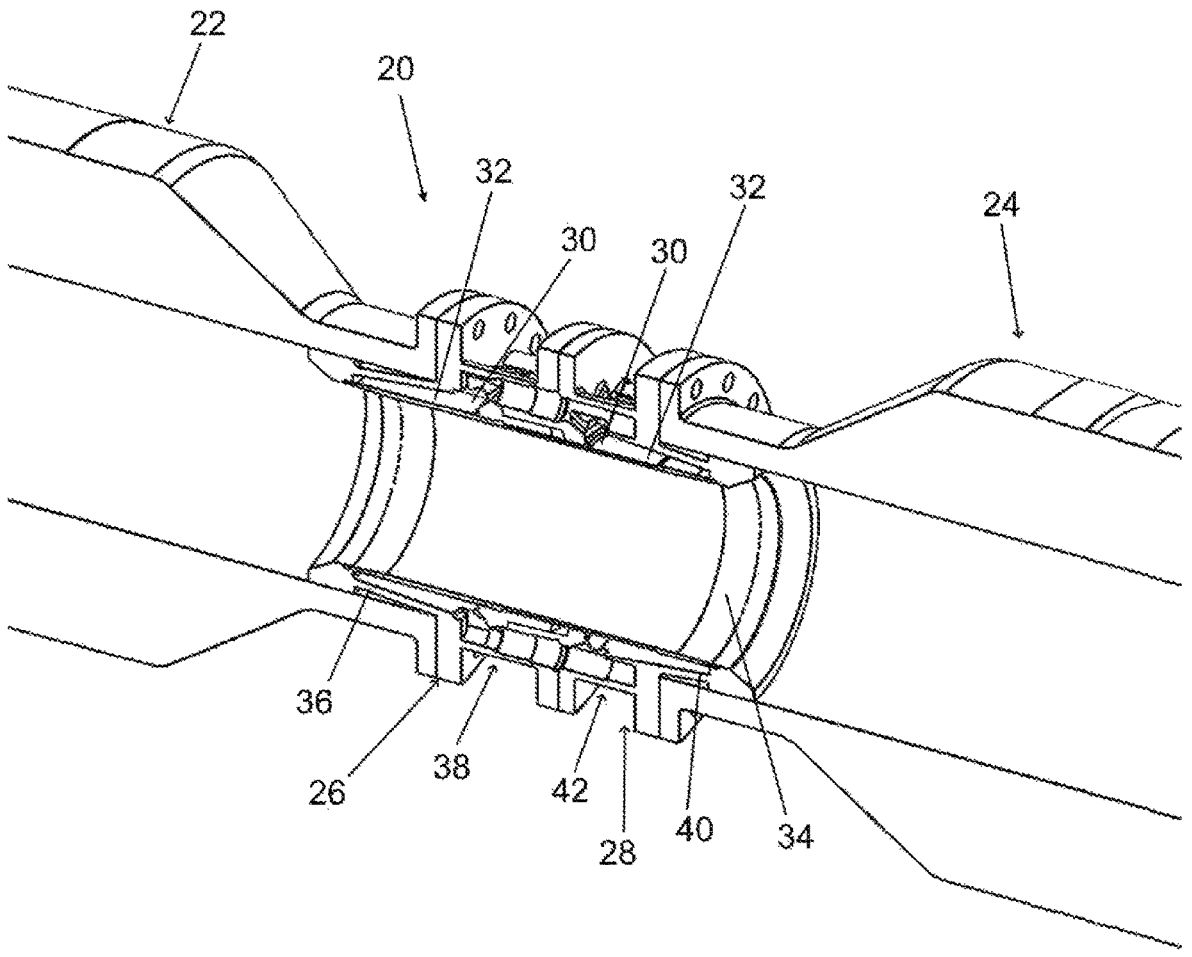

A fluid conduit assembly according to an embodiment of the invention is shown in FIG. 1, and is designated generally by the reference numeral 20.

The fluid conduit assembly 20 comprises first and second fluid conduits and a breakaway coupling. In use, the fluid conduit assembly transports a fluid from one location to another location.

Each of the first and second fluid conduits is in the form of a flexible hose 22,24.

The breakaway coupling comprises a pair of coupling sections, each of which is in the form of a respective shut-off valve housing 26,28 that defines a hollow bore along which flowable material may flow. The shut-off valve housings 26,28 are respectively fluidly coupled to the first and second flexible hoses 22,24 such that securing the shut-off valve housings 26,28 to each other fluidly interconnects the first and second flexible hoses 22,24. More specifically, an abutment end of each of the shut-off valve housings 26,28 is formed to define a flange extending about its circumference, and the flanges define opposed contact surfaces which on abutment of the shut-off valve housings 26,28 are brought into abutting engagement. The abutting flanges are releasably secured to each other by means of a plurality of releasable fasteners.

In the embodiment shown, the releasable fasteners may be configured to each include a respective frangible element such as a breakstud, which is formed to include a weakened portion (e.g. a reduced cross-section) that breaks on exposure to a tensile load exceeding a predetermined limit. Such a tensile load may be applied to the fluid conduit assembly 20 as a result of unexpected movement of objects connected to the ends of the fluid conduit assembly 20 or due to excessive pressure (e.g. a pressure surge) within the fluid conduit assembly 20. The use of a respective breakstud with the weakened portion permits the automatic separation of the shut-off valve housings 26,28 in response to the tensile load exceeding a predetermined limit. More particularly, upon application of such a tensile load, each breakstud breaks at its weakest section, thus permitting the shut-off valve housings 26,28 to separate from each other. Such automatic separation can be carried out independently of any control and/or monitoring system.

It is envisaged that, in other embodiments of the invention, each frangible element may be replaced by a different type of releasable fastener.

A respective shut-off valve in the form of a PETAL VALVE™ valve is located within the hollow bore of each shut-off valve housing 26,28. Each shut-off valve includes a plurality of petal elements, each of which has a pivot member 30 and a valve member 32. It will be understood that each shut-off valve may include any number of petal elements. The plurality of petal elements may be identical in shape and/or size, or may differ from each other in terms of their shapes and/or sizes.

The valve member 32 of each petal element is pivotally movable relative to the hollow bore via the respective pivot member 30 that is pivotally mounted to an inner wall of the respective shut-off valve housing 26,28. Each petal element is rotatable between a fully retracted position which corresponds to a valve open position of the corresponding shut-off valve, and a fully extended position which corresponds to a valve closed position of the corresponding shut-off valve. In the valve closed position of each shut-off valve, all the valve members 32 abut one another to form a cone which faces or opposes the direction of flow of the flowable material along the fluid conduit assembly 20. For each shut-off valve, the apex of the cone defines a meeting point for all the petal elements when the shut-off valve is in the valve closed position. It will be appreciated that the edge of one or more of the petal elements may optionally include a seal formed thereon.

Figure 2:
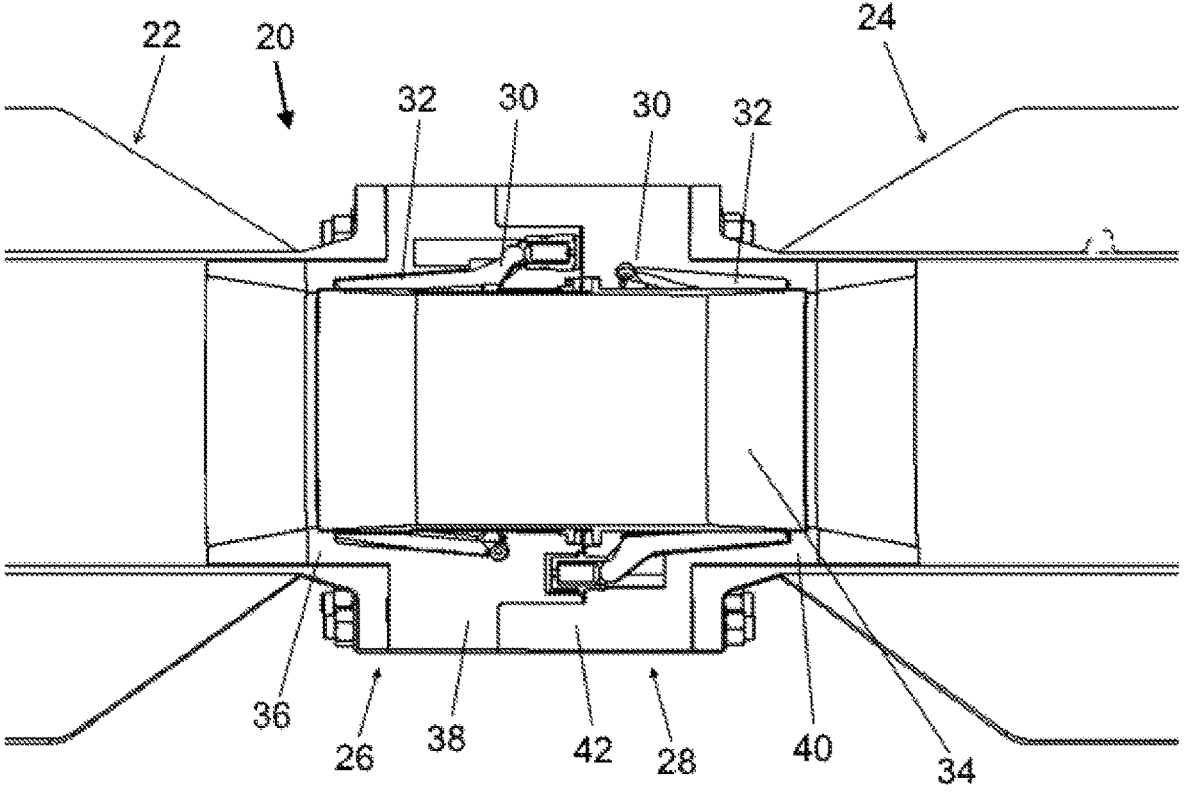
Figure 3:
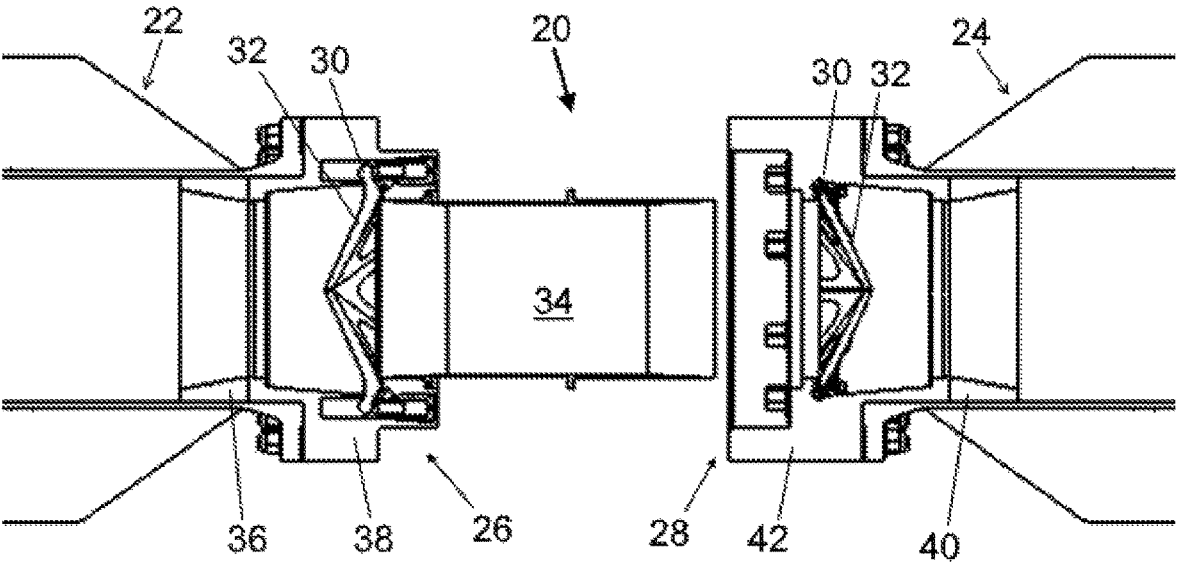

FIGS. 2 and 3 respectively show the fluid conduit assembly 20 when the shut-off valve housings 26,28 are connected and separated.

Each shut-off valve when in the valve open position opens the hollow bore of the corresponding shut-off valve housing 26,28 so as to allow flowable material to flow along the hollow bore. Each shut-off valve when in the valve closed position closes the hollow bore of the corresponding shut-off valve housing 26,28 so as to prevent flowable material from flowing along the hollow bore.

The breakaway coupling further includes an internal sleeve 34 arranged within the shut-off valve housings 26,28. When the shut-off valve housings 26,28 are secured to each other, the internal sleeve is arranged to push against both shut-off valves so that their petal elements are in their fully retracted positions and the shut-off valves are in their valve open positions. When the shut-off valve housings 26,28 separate from each other, the internal sleeve is arranged to move away from the shut-off valves so that their petal elements are allowed to move from their fully retracted positions to their fully extended positions in order to close the shut-off valves.

In other embodiments of the invention, it is envisaged that the breakaway coupling may include only one of the shut-off valves, with the single shut-off valve being located in one of the shut-off valve housings.

The shut-off valve arrangement shown in FIG. 1 is referred to by the applicant as a PETAL VALVE™ arrangement, other examples of which are described in EP 0 006 278 A1 and GB 2051993 A.

A first 26 of the shut-off valve housings 26,28 is connected to the first flexible hose 22 so that a first end 36 of the first shut-off valve housing 26 extends inside a hollow bore of the first flexible hose 22 and a second end 38 of the first shut-off valve housing 26 is located outside the hollow bore of the first flexible hose 22. The outer diameter of the first end of the first shut-off valve housing 26 is dimensioned to fit the inner diameter of the hollow bore of the first flexible hose 22.

A second 28 of the shut-off valve housings 26,28 is connected to the second flexible hose 24 so that a first end 40 of the second shut-off valve housing 28 extends inside a hollow bore of the second flexible hose 24 and a second end 42 of the second shut-off valve housing 28 is located outside the hollow bore of the second flexible hose 24. The outer diameter of the first end of the second shut-off valve housing 28 is dimensioned to fit the inner diameter of the hollow bore of the second flexible hose 24.

Configuring the first ends 36,40 of the first and second shut-off valve housings 26,28 to respectively extend inside the hollow bore of the first and second flexible hoses 22,24 enhances the robustness of the connection of the breakaway coupling to the flexible hoses 22,24.

Optionally an intermediate element, such as a collar or a sealing element, may be arranged between each first end 36,40 and an inner wall of the corresponding flexible hose 22,24.

The second end 38 of the first shut-off valve housing 26 includes a flange that extends about the circumference of the first shut-off valve housing 26 adjacent to the first end 36, with the flange being secured to a flange of the first flexible hose 22. The second end 42 of the second shut-off valve housing 28 also includes a flange that extends about the circumference of the second shut-off valve housing 28 adjacent to the first end 40, with the flange being secured to a flange of the second flexible hose 24.

In the embodiment shown, the flanges are secured together using a plurality of screw fasteners. In other embodiments of the invention, it is envisaged that the plurality of screw fasteners may be replaced by one or more other flange fasteners, such as a nut and bolt arrangement, a collar for securing the flanges together, or a clamping device for securing the flanges together.

In comparison to a screwed or threaded joint, the provision of the flanged joint to secure the shut-off valve housings 26,28 and flexible hoses 22,24 together reduces the amount of bending moment experienced by the breakaway coupling and also avoids damage to inner walls of the hollow bores of the flexible hoses 22,24. Also, in comparison to a screwed or threaded joint, the flanged joint is also simpler and cheaper to repair or replace, and the flanged joint makes it easier to attach and detach the first and second shut-off valve housings 26,28 from the corresponding flexible hoses 22,24.

The provision of the flanged joint allows an outer wall of each first end 36,40 to be configured as a smooth outer wall that is non-threaded, protrusion-free and groove-free. This is because the outer wall of each first end 36,40 is not required to function as a fastening surface to secure the first ends 36,40 inside the hollow bores of the first and second flexible hoses 22,24.

The length of each first end 36,40 extending inside the hollow bore of the corresponding flexible hose 22,24 may be between 10% and 90% of the total length of the corresponding shut-off valve housing 26,28, preferably between 20% and 80% of the total length of the corresponding shut-off valve housing 26,28, between 30% and 70% of the total length of the corresponding shut-off valve housing 26,28, between 40% and 60% of the total length of the corresponding shut-off valve housing 26,28, or 50% of the total length of the corresponding shut-off valve housing 26,28.

In the embodiment shown, part of each shut-off valve is arranged inside the first end 36,40 of the corresponding shut-off valve housing 26,28, and the other part of each shut-off valve is arranged inside the second end 38,42 of the corresponding shut-off valve housing 26,28 as follows.

The pivot member 30 of each shut-off valve is pivotally mounted to the inner wall of the second end 38,42 of the corresponding shut-off valve housing 26,28, and thereby is located inside the second end 38,42 of the corresponding shut-off valve housing 26,28.

The valve member 32 of each shut-off valve in its valve open position extends across the first and second ends 36,38,40,42 of the corresponding shut-off valve housing 26,28. That is to say, the valve member 32 of each shut-off valve in its valve open position is located partly inside the hollow bore of the corresponding flexible hose 22,24 and partly outside the hollow bore of the corresponding flexible hose 22,24. It is envisaged that, in other embodiments of the invention, the valve member of each shut-off valve in its valve open position may be located completely inside the second end of the corresponding shut-off valve housing.

The valve member 32 of each shut-off valve in its valve closed position also extends across the first and second ends 36,38,40,42 of the corresponding shut-off valve housing 26,28. That is to say, the valve member 32 of each shut-off valve in its valve closed position is located partly inside the hollow bore of the corresponding flexible hose 22,24 and partly outside the hollow bore of the corresponding flexible hose 22,24. It is envisaged that, in other embodiments of the invention, the valve member of each shut-off valve in its valve closed position may be located completely inside the second end of the corresponding shut-off valve housing.

Configuring the first ends 36,40 of the first and second shut-off valve housings 26,28 to respectively extend inside the hollow bore of the first and second flexible hoses 22,24 permits the effective length of the breakaway coupling, i.e. the length of the breakaway coupling between the flexible hoses 22,24, and at the same time maintain the actual length of the breakaway coupling required to accommodate the structure and operation of each shut-off valve. In addition, the arrangement of part of each shut-off valve inside the first end 36,40 of the corresponding shut-off valve housing 26,28 permits the further reduction of the effective length of the breakaway coupling without compromising on the structure and operation of each shut-off valve.

Reducing the effective length of the breakaway coupling advantageously decreases the amount of bending moment experienced by the breakaway coupling during use of the fluid conduit assembly 20, particularly in reeling applications, such as reeling of the fluid conduit assembly 20 around a reel or unreeling of the fluid conduit assembly 20 from the reel, which can generate bending moments resulting in tensile loads beyond an allowable tensile load rating.

Configuring the first ends 36,40 of the first and second shut-off valve housings 26,28 to respectively extend inside the hollow bore of the first and second flexible hoses 22,24 also allows the first and second flexible hoses 22,24 to form an outer housing that encloses the first ends 36,40 of the shut-off valve housings 26,28. This in turn permits the outer diameters of the first ends 36,40 to be narrower than the outer diameters of the corresponding second ends 38,42, which reduces the amount and cost of material required to construct the breakaway coupling allows for a reduction in overall size and weight of the breakaway coupling. As a result, the reduced weight of the breakaway coupling makes it easier to handle the breakaway coupling during installation and after separation of the shut-off valve housings 26,28 but also diminishes the risk of auto-submergence of the ends of the flexible hoses 22,24 after separation of the shut-off valve housings 26,28.

The formation of the outer housing enclosing the first ends 36,40 of the shut-off valve housings 26,28 by the first and second flexible hoses 22,24 also provides additional protection for the first ends 36,40 of the shut-off valve housings 26,28, in particular the features of the shut-off valves internal to the first ends 36,40, from accidental damage and the environment.

The configuration of the fluid conduit assembly 20 of FIG. 1 therefore enables the construction of a breakaway coupling that has reduced size, weight and cost, improved handling during installation and post-separation, reduced risk of post-separation auto-submergence and additional protection, without adversely affecting the breakaway coupling's capability to block the flow of the flowable material through the hollow bore upon separation of the shut-off valve housings 26,28.

The arrangement of each pivot member and each valve member in the corresponding shut-off valve housing may be modified depending on the structure and operation of each pivot member and each valve member.

It is envisaged that, in other embodiments of the invention, the pivot member of each shut-off valve may be pivotally mounted to the inner wall of the first end of the corresponding shut-off valve housing. In such embodiments, the valve member of each shut-off valve in its valve open and closed positions may be located completely inside the first end of the corresponding shut-off valve housing.

It is envisaged that, in still other embodiments of the invention, the pivot member of each shut-off valve may be pivotally mounted to the inner walls of the first and second ends of the corresponding shut-off valve housing. In such embodiments, the valve member of each shut-off valve in its valve open position may be located completely inside the first end of the corresponding shut-off valve housing, or may extend across the first and second ends of the corresponding shut-off valve housing. In further such embodiments, the valve member of each shut-off valve in its valve closed position may be located completely inside the first end of the corresponding shut-off valve housing, or may extend across the first and second ends of the corresponding shut-off valve housing.

The flow of flowable material through the fluid conduit assembly 20 will be described with reference to the first shut-off valve housing 26 configured as an upstream shut-off valve housing and the second shut-off valve housing 28 configured as a downstream shut-off valve housing. It will be appreciated that the following description applies mutatis mutandis to the second shut-off valve housing 28 configured as an upstream shut-off valve housing and the first shut-off valve housing 26 configured as a downstream shut-off valve housing.

In the embodiment shown, each of the first ends 36,40 has a straight tapered bore profile that tapers in a direction towards the corresponding second end 38,42. The straight tapered bore profile defines a section of a hollow bore of the corresponding first end 36,40 that is furthest inside the hollow bore of the corresponding flexible hose 22,24, i.e. the section of the hollow bore of the corresponding first end 36,40 that is furthest away from the corresponding second end 38,42.

Figure 4:
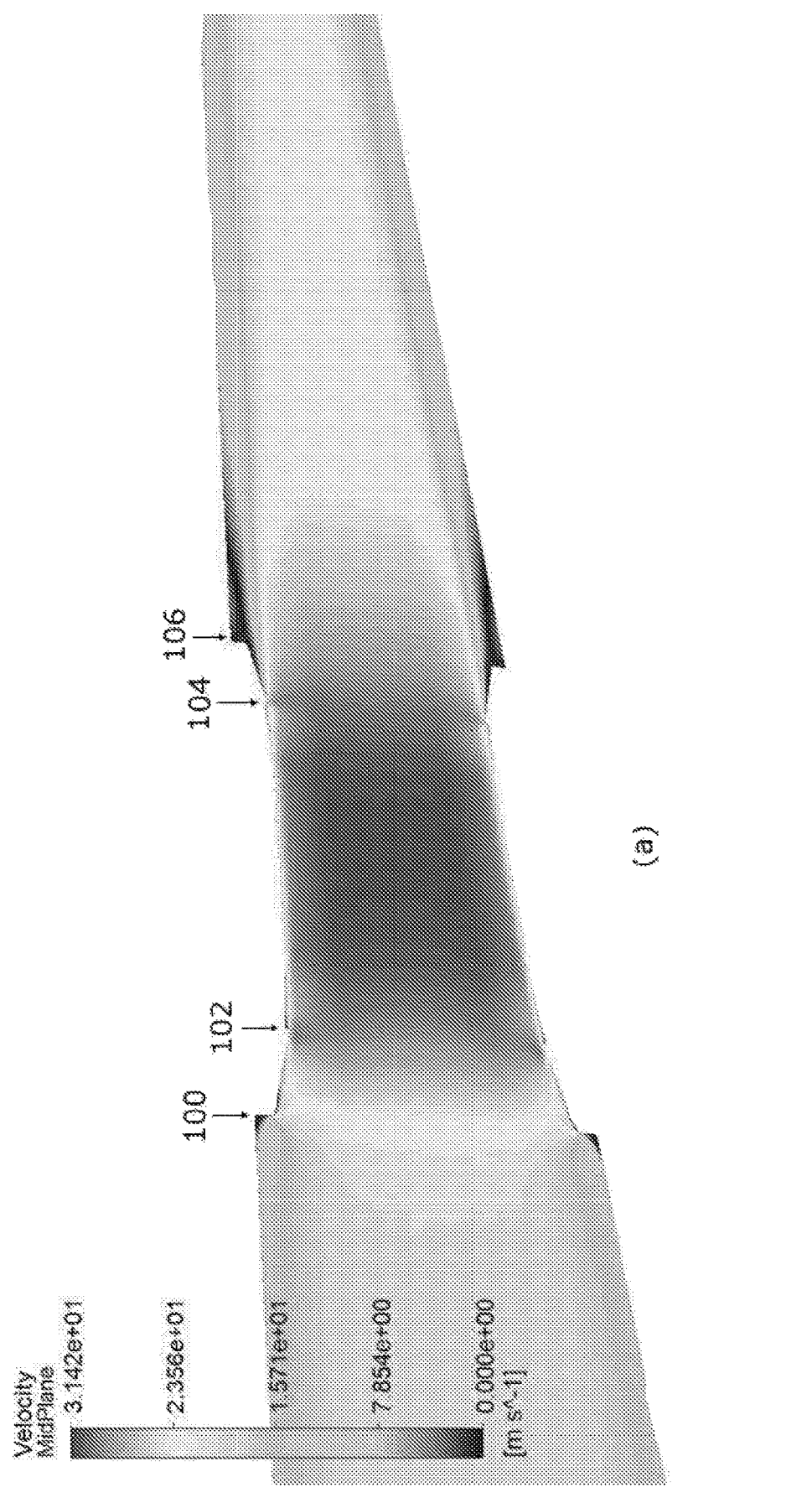
FIGS. 4 to 12 show the simulated flow performance of fluid conduit assemblies according to embodiments of the invention.

During the flow of flowable material along the flexible hoses 22,24 and shut-off valve housings 26,28, flow separation occurs at several locations corresponding to changes in bore geometry, particularly locations corresponding to the transitions between the bore of each flexible hose 22,24 and the narrower bore of the inserted first end 36,40. FIG. 4_a_ shows the locations 100,102,104,106 of the flow separation in the fluid conduit assembly 20. Meanwhile FIGS. 4_b_, 4_c_ and 4_d_ show close-ups of the location 100 of the flow separation at the inlet of the breakaway coupling, the location 102 of the flow separation within the first shut-off valve housing 26, the location 104 of the flow separation within the second shut-off valve housing 28 and the location 106 of the flow separation at the outlet of the breakaway coupling. It can be seen that the flow separation at the outlet of the breakaway coupling is larger than the flow separation at the inlet of the breakaway coupling.

Figure 5:
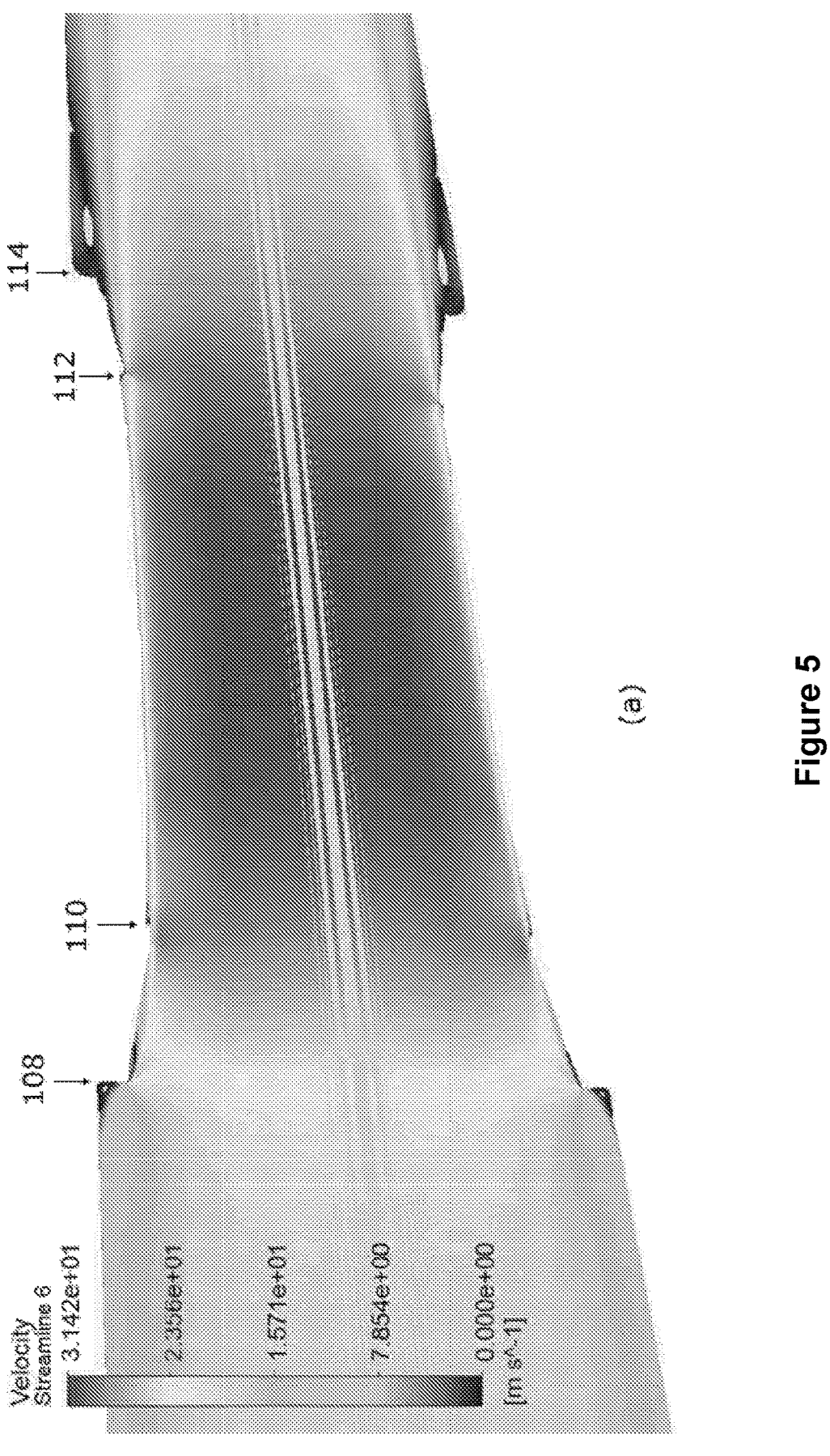
Figure 6:
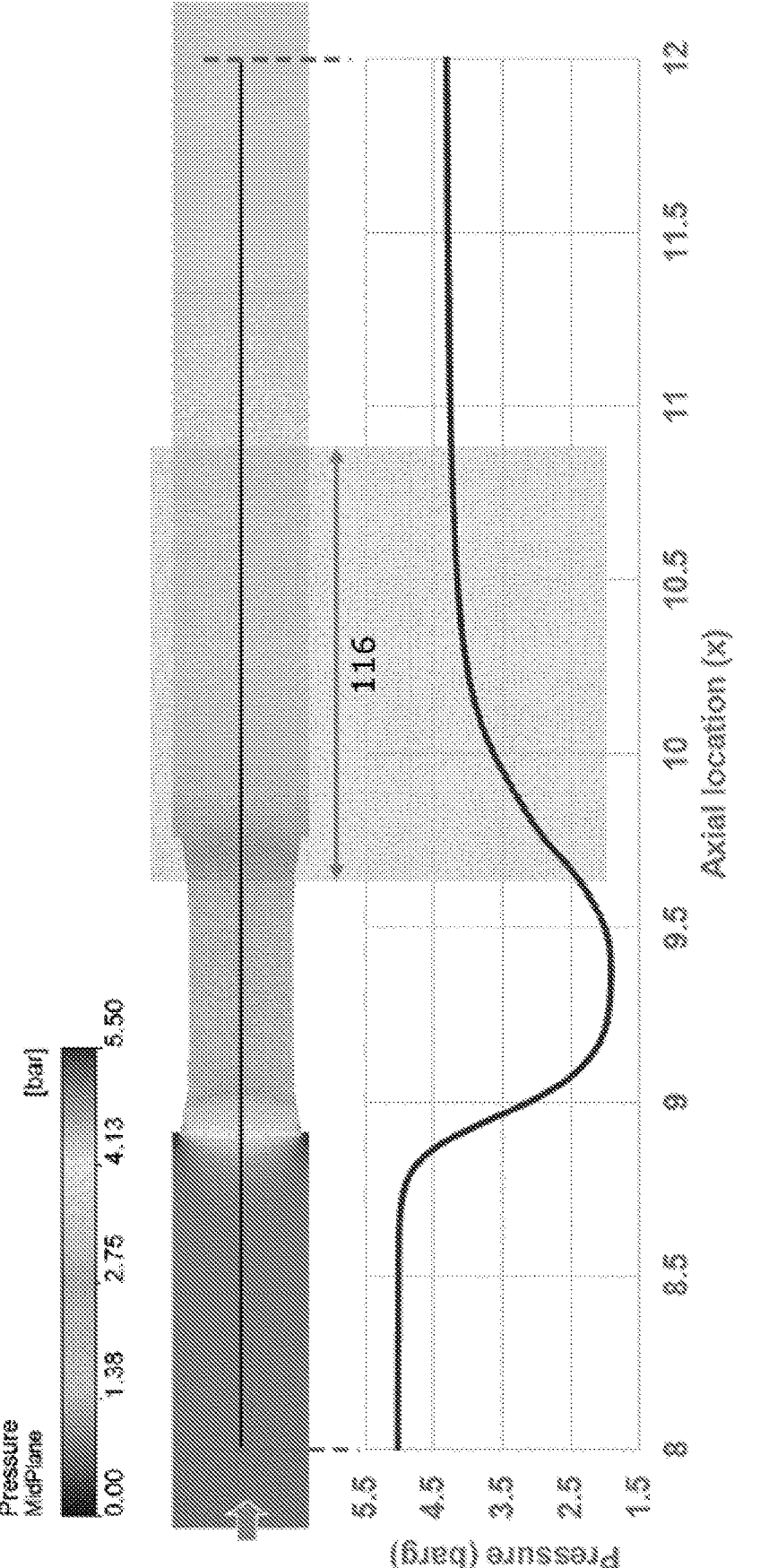

The flow separation creates localized flow recirculation zones with eddies that contribute to higher energy loss and increased pressure drop in the flow of the flowable material. FIG. 5_a_ shows the locations 108,110,112,114 of the flow recirculation zones in the fluid conduit assembly 20. Meanwhile FIGS. 5_b_, 5_c_ and 5_d_ show close-ups of the location 108 of the flow recirculation zone at the inlet of the breakaway coupling, the location 110 of the flow recirculation zone within the first shut-off valve housing 26, the location 112 of the flow recirculation zone within the second shut-off valve housing 28 and the location 114 of the flow recirculation zone at the outlet of the breakaway coupling, FIG. 6 illustrates the variation in pressure along the axial length of the fluid conduit assembly 20. The fluid pressure dips in the narrower bore of the breakaway coupling due to high localized fluid velocity and recovers at a certain distance downstream of the breakaway coupling due to large flow recirculation zones. The pressure recovery zone is indicated as '116' in FIG. 6. By streamlining the shape of the bore of the breakaway coupling to provide a less abrupt change of bore geometry in comparison to a straight bore profile, the straight tapered bore profiles of the first ends 36,40 improve the flow performance of the fluid conduit assembly 20 by minimizing or delaying flow separation, enabling quicker flow reattachment and suppressing the size of the flow recirculation zones and associated eddies in order to reduce energy loss and pressure drop and achieve faster pressure recovery.

In other embodiments of the invention, the straight tapered bore profile may be replaced by a curved tapered bore profile in the form of a convex tapered bore profile.

Figure 7:
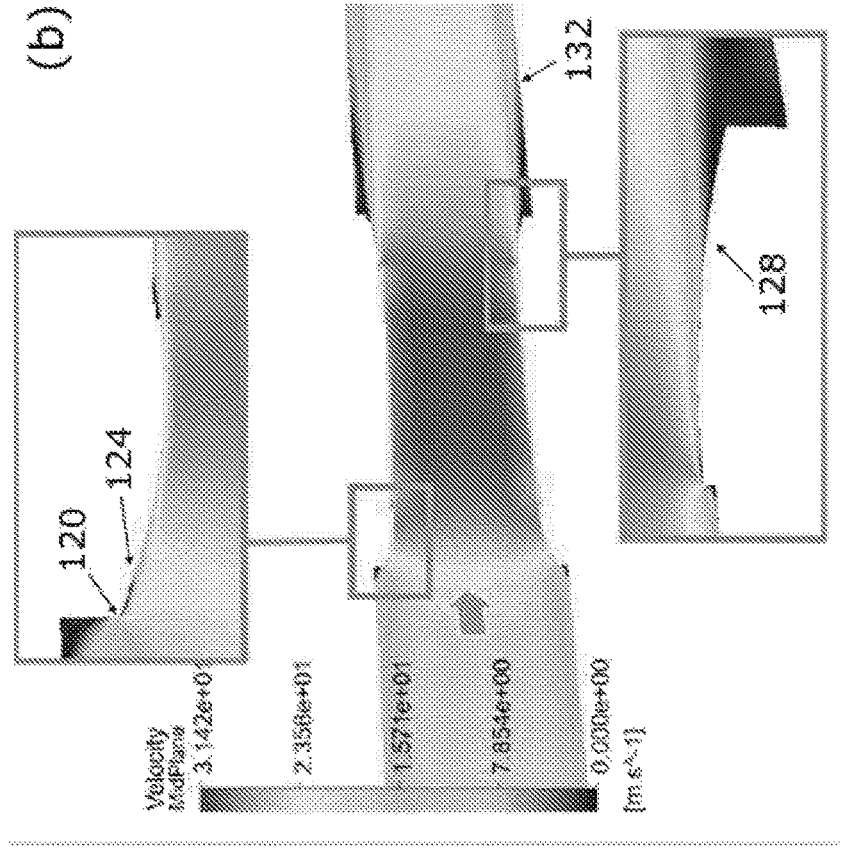
Figure 7:
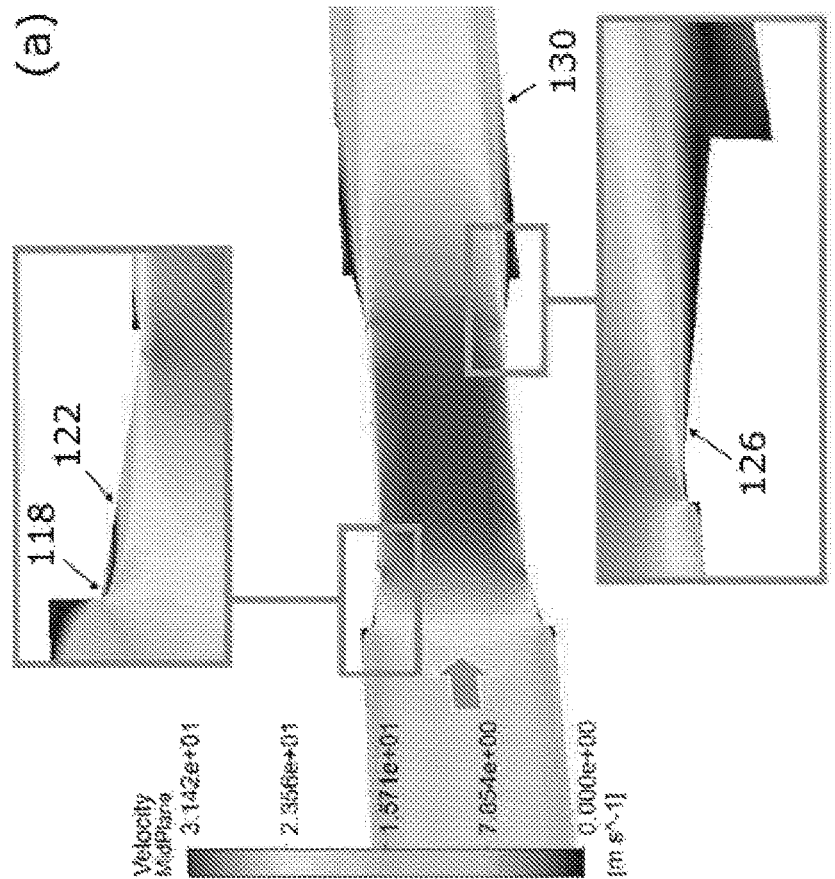

FIG. 7 compares the flow performance of a fluid conduit assembly having first ends with straight tapered bore profiles (FIG. 7a) against the flow performance of a fluid conduit assembly having first ends with convex tapered bore profiles (FIG. 7b). At the inlet of the breakaway coupling, the flow separation locations 118,120 of the straight tapered bore profile and the convex tapered bore profile are the same, but the flow reattachment location 122 of the straight tapered bore profile is further downstream than the flow reattachment location 124 of the convex tapered bore profile. At the outlet of the breakaway coupling, the flow separation location 126 of the straight tapered bore profile is further upstream than the flow separation location 128 of the convex tapered bore profile, and the flow reattachment location 130 of the straight tapered bore profile is further downstream than the flow reattachment location 132 of the convex tapered bore profile. The relatively steeper change of bore geometry in the straight tapered bore profile causes an earlier flow detachment due to the momentum of the escaping fluid, while the more gradual change of bore geometry in the convex tapered bore profile results in a later flow detachment. As a result, the convex tapered bore profile achieves a better flow performance than the straight tapered bore profile by providing shorter pressure recovery zones that are defined by the distance between the flow separation and reattachment locations.

Figure 8:
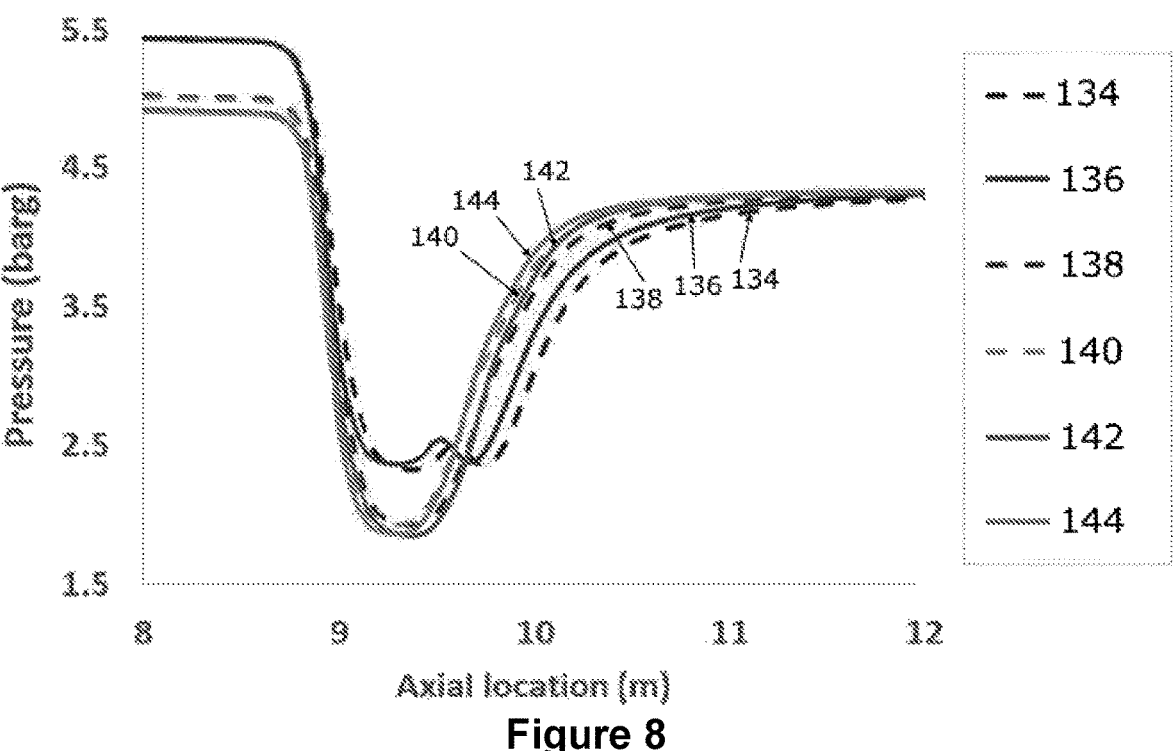

FIG. 8 illustrates the variation in pressure along the axial length of the fluid conduit assembly for configurations having:

(i) an inlet first end with a straight tapered bore profile and an outlet first end with a straight bore profile (i.e. bluff-body outlet), indicated as '134';

(ii) an inlet first end with a convex tapered bore profile and an outlet first end with a straight bore profile (i.e. bluff-body outlet), indicated as '136';

(iii) inlet and outlet first ends with straight tapered bore profiles, indicated as '138';

(iv) inlet and outlet first ends with straight tapered bore profiles, where the axial length of the straight tapered bore profile of the inlet first end is significantly shorter than the axial length of the straight tapered bore profile of the outlet first end, indicated as '140';

(v) inlet and outlet first ends with convex tapered bore profiles, indicated as '142';

(vi) inlet and outlet first ends with convex tapered bore profiles, where the axial length of the convex tapered bore profile of the inlet first end is significantly shorter than the axial length of the convex tapered bore profile of the outlet first end, indicated as '144'.

It can be seen from FIG. 8 that configurations (i) and (ii) have the highest upstream pressures followed by configurations (iii) and (iv) with the straight tapered bore profiles followed by configurations (v) and (vi) with the convex tapered bore profiles having the lowest upstream pressures.

It can also be seen from FIG. 8 that pressure recovery zones for convex tapered bore profiles are shorter than pressure recovery zones for straight tapered bore profiles. In particular, configuration (v) achieves quicker pressure recovery than configuration (iii), and configuration (vi) achieves quicker pressure recovery than configuration (iv), Furthermore, the magnitude of the axial length of the tapered bore profile of the inlet first end has minimal impact on the upstream pressure. Therefore, the axial length of the tapered bore profile of the inlet first end may be decreased to reduce the cost and weight of the breakaway coupling without significantly impacting on the overall flow performance. Meanwhile the axial length of the tapered bore profile of the outlet first end can be configured to be longer to minimize or delay flow separation and suppress the size of the flow recirculation zones.

TABLE 1

| | Axial length of tapered bore profile | | Axial length of tapered bore profile | | Results | |
| | of inlet first end | | of outlet first end | | K-factor, | Pressure |
| No. | Length (mm) | Diameter (mm) | Length (mm) | Diameter (mm) | hydraulic resistance | drop (bar) |
|---|---|---|---|---|---|---|
| 1 | 49.3 | 375 | 0 | 348.5 | 0.93 | 1.40 |
| 2 | 49.3 | 375 | 49.3 | 348.5 | 0.74 | 1.12 |
| 3 | 49.3 | 375 | 79.9 | 348.5 | 0.61 | 0.93 |
| 4 | 49.3 | 375 | 119.3 | 348.5 | 0.50 | 0.76 |
| 5 | 49.3 | 375 | 159.3 | 348.5 | 0.42 | 0.63 |
| 6 | 49.3 | 375 | 189.3 | 348.5 | 0.41 | 0.61 |

Figure 9:
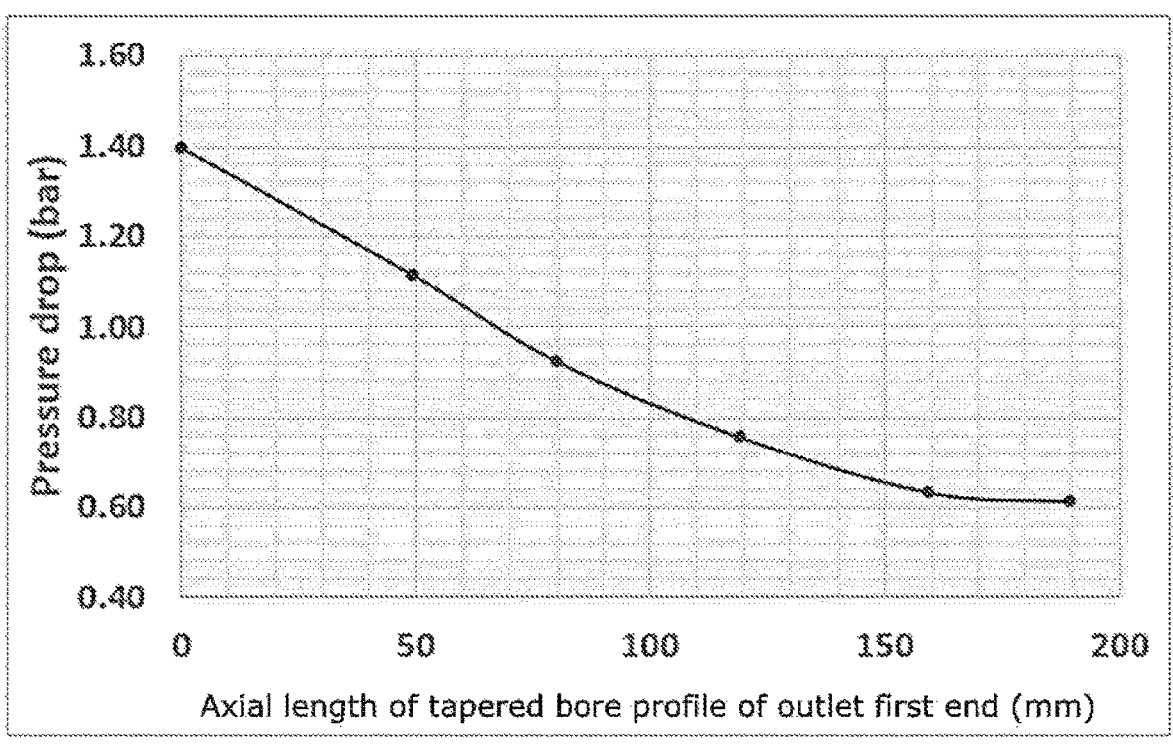

Table 1 and FIG. 9 illustrate the influence of the axial length of the convex tapered bore profile of the outlet first end on the pressure drop in the fluid conduit assembly. Specifically, the pressure drop in the fluid conduit assembly increases as the axial length of the convex tapered bore profile of the outlet first end decreases. This is due to the shorter axial length of the convex tapered bore profile resulting in a steeper change of bore geometry and thereby creating a larger flow recirculation zone downstream.

On the other hand the rate of reduction in pressure drop decreases as the axial length of the convex tapered bore profile of the outlet first end increases, and an excessively long axial length of the convex tapered bore profile of the outlet first end is not desirable due to the additional material cost and weight. Hence, the axial length of the convex tapered bore profile of the outlet first end must be chosen to strike a desired balance between achieving a desired pressure drop and controlling material costs and weight.

Figure 10:
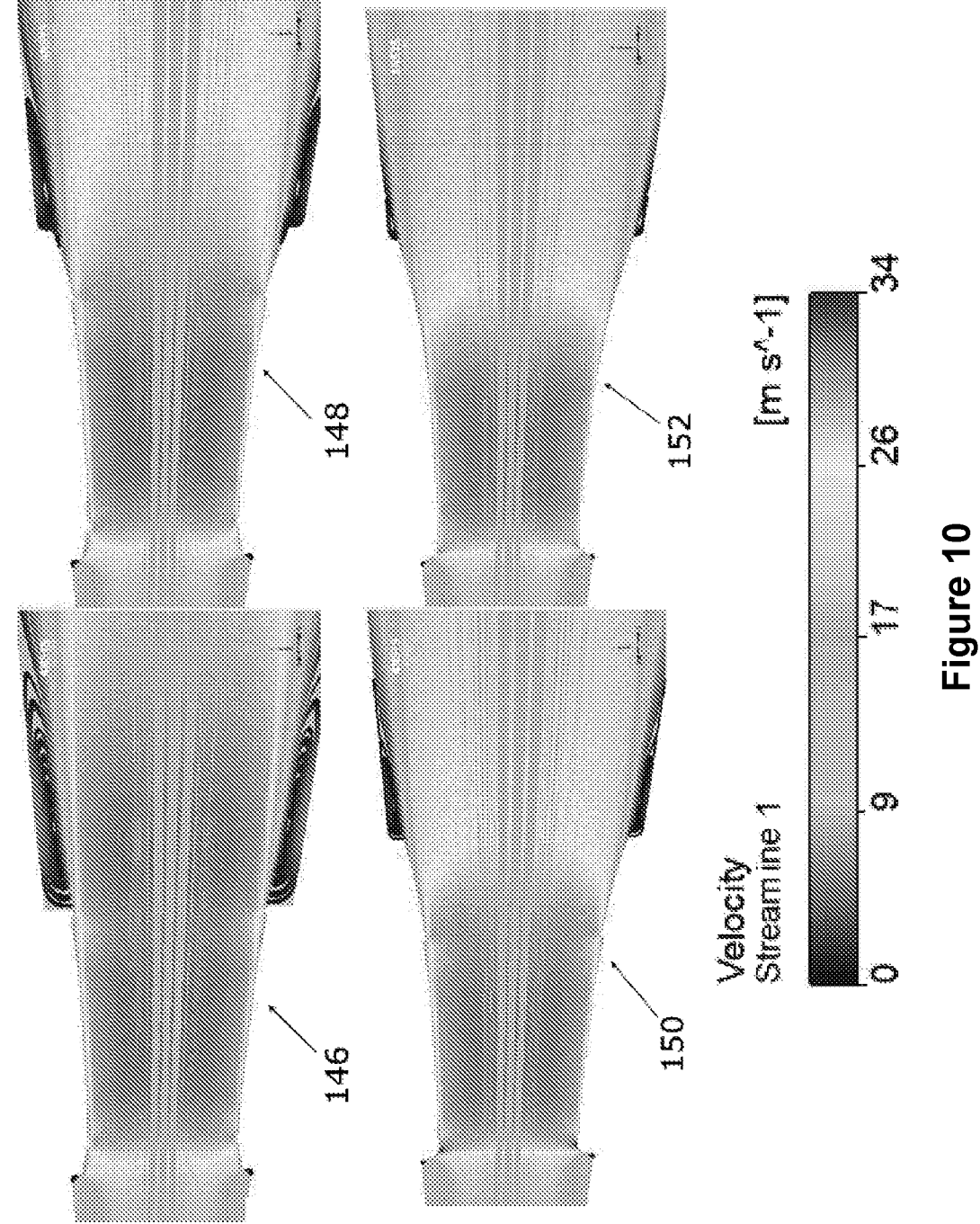

FIG. 10 illustrates the variation in flow recirculation zone size downstream of the outlet of the breakaway coupling for configurations having:

(i) an inlet first end with a straight tapered bore profile and an outlet first end with a straight bore profile (i.e. bluff-body outlet), indicated as '146';

(ii) inlet and outlet first ends with straight tapered bore profiles, indicated as '148';

(iii) inlet and outlet first ends with convex tapered bore profiles, where the axial length of the convex tapered bore profile of the inlet first end is significantly shorter than the axial length of the convex tapered bore profile of the outlet first end, indicated as '150';

(iv) inlet and outlet first ends with convex tapered bore profiles that form part of a continuous, smooth bore profile that extends throughout the hollow bores of the coupling sections, indicated as '152'.

It can be seen from FIG. 10 that, out of the four configurations, configuration (i) results in the largest flow recirculation zone size followed by configurations (ii) and (iii) and finally configuration (iv) with the smallest flow recirculation zone. This is primarily due to the effect of the shape of the bore profile of the outlet first end on the flow separation location.

TABLE 2

| Config- uration | Axial length of tapered bore profile of inlet first end | | Axial length of tapered bore profile of outlet first end | | Results | |
|---|---|---|---|---|---|---|
| | Length (mm) | Diameter (mm) | Length (mm) | Diameter (mm) | K-factor, hydraulic resistance | Pressure drop (bar) |
| (i), 154 | 119.3 | 348.5 | 0 | 348.5 | 0.95 | 1.44 |
| (ii), 156 | 119.3 | 348.5 | 119.3 | 348.5 | 0.54 | 0.82 |
| (iii), 158 | 49.3 | 375 | 189.3 | 348.5 | 0.41 | 0.61 |
| (iv), 160 | 49.3 | 375 | 189.3 | 335 | 0.25 | 0.38 |

Figure 11:
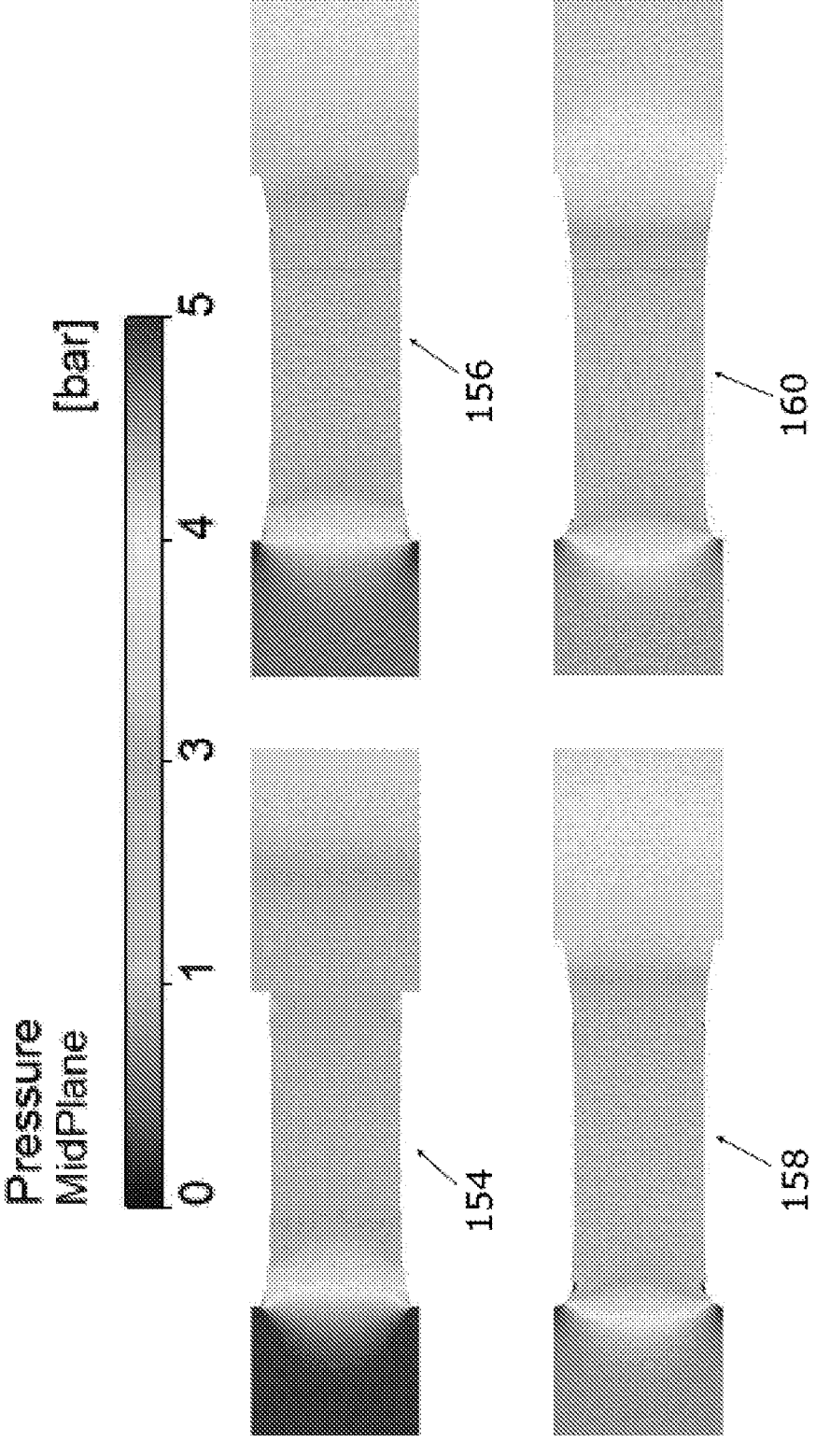
Figure 12:
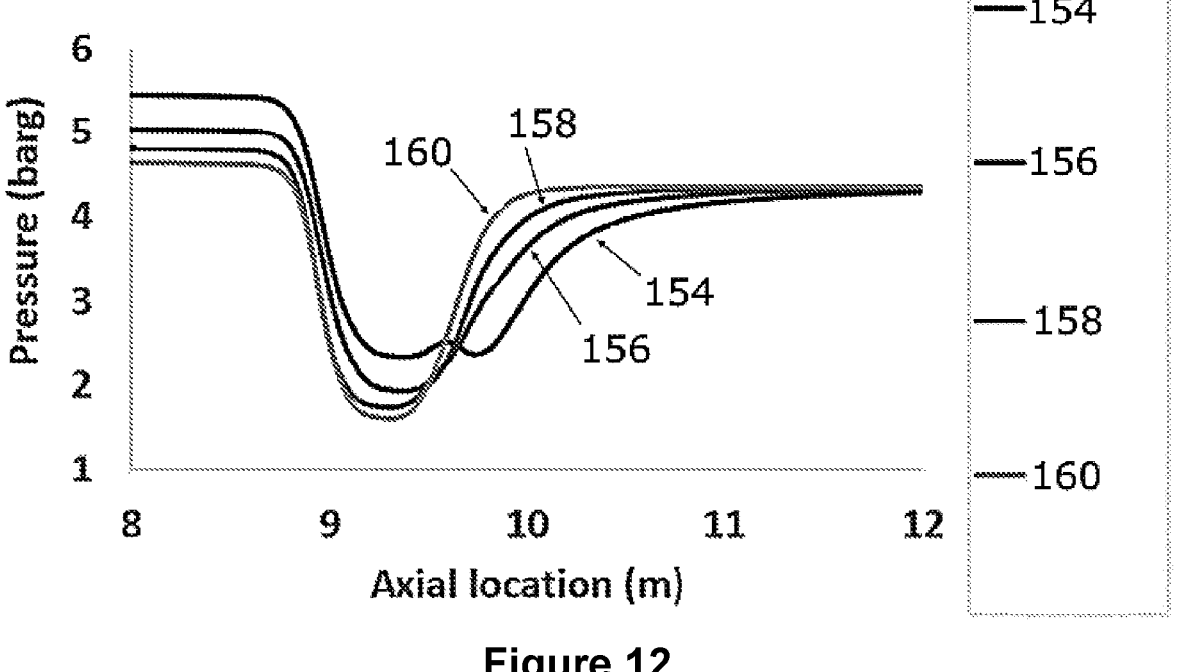

FIGS. 11 and 12 and Table 2 illustrate the variation in pressure along the axial length of the fluid conduit assembly for configurations having:

(i) an inlet first end with a straight tapered bore profile and an outlet first end with a straight bore profile (i.e. bluff-body outlet), indicated as '154';

(ii) inlet and outlet first ends with straight tapered bore profiles, indicated as '156';

(iii) inlet and outlet first ends with convex tapered bore profiles, where the axial length of the convex tapered bore profile of the inlet first end is significantly shorter than the axial length of the convex tapered bore profile of the outlet first end, indicated as '158';

(iv) inlet and outlet first ends with convex tapered bore profiles that form part of a continuous, smooth bore profile that extends throughout the hollow bores of the coupling sections, indicated as '160'.

It can be seen from FIGS. 11 and 12 that, out of the four configurations, configuration (i) results in the largest pressure drop and the longest pressure recovery zone followed by configurations (ii) and (iii) and finally configuration (iv) with the smallest pressure drop and the shortest pressure recovery zone. This is primarily due to the effect of the shape of the bore profiles of the inlet and outlet first ends.

A width of a hollow bore of the inlet first end may be configured to be larger than a width of a hollow bore of the outlet first end so as to create a smaller flow impingement zone at the inlet of the breakaway coupling, which in turn results in a lower pressure drop.

Other bore profiles of the breakaway coupling are envisaged. For example, each first end may have a straight bore profile.

A fluid conduit assembly according to a second embodiment of the invention is shown in FIG. 13 and is designated generally by the reference numeral 220. The fluid conduit assembly 220 of FIG. 13 is similar in structure and operation to the fluid conduit assembly 20 of FIG. 1 and like features share the same reference numerals.

The fluid conduit assembly 220 of FIG. 13 differs from the fluid conduit assembly 20 of FIG. 1 in that a different type of shut-off valve is employed in each shut-off valve housing 26,28 of FIG. 13.

A respective FLIP-FLAP™ valve is located within the hollow bore of each shut-off valve housing 26,28. Each shut-off valve includes a valve member 232 movable between a valve open position and a valve closed position. In the valve open position, each valve member 232 bisects the hollow bore of the respective shut-off valve housing 26,28. In the valve closed position, the valve member 232 sealingly engages against a valve seat defined about the circumference of the hollow bore of the respective shut-off valve housing 26,28 to shut off the flow of a flowable material through the hollow bore.

FIGS. 14 and 15 respectively show the fluid conduit assembly 220 when the shut-off valve housings 26,28 are connected and separated.

Each valve member 232 is biased to move to its valve closed position on separation of the shut-off valve housings 26,28. Each valve member 232 is mounted on a pivot shaft 230 and is biased to move to its valve closed position by means of a spring. The spring preferably includes contra wound spring portions mounted on opposite ends of the pivot shaft 230 and engaged with the valve members 232 so as to bias each of the valve members 232 towards the valve closed position.

The shut-off valves are located in the respective shut-off valve housings 26,28 in opposed configurations such that, whilst the shut-off valve housings 26,28 are secured to each other, the opposing valve members 232 interleave with each other when they are in their valve open positions. This interleaving engagement allows each valve member 232 to oppose movement of the other valve member 232 until separation of the shut-off valve housings 26,28 moves the valve members 232 out of engagement with each other and the bias provided by the springs causes the valve members 232 to move to their valve closed positions.

The shut-off valve arrangement shown in FIG. 13 is referred to by the applicant as a FLIP-FLAP™ valve arrangement, examples of which are described in EP 2 000 730 A2.

In the embodiment shown, part of each shut-off valve is arranged inside the first end 36,40 of the corresponding shut-off valve housing 26,28, and the other part of each shut-off valve is arranged inside the second end 38,42 of the corresponding shut-off valve housing as follows.

The pivot shaft 230 of the first shut-off valve is pivotally mounted to the inner wall of the first end 36 of the first shut-off valve housing 26, and thereby is located inside the first end 36 of the first shut-off valve housing 26. The pivot shaft 230 of the second shut-off valve is pivotally mounted to the inner wall of the second end 42 of the second shut-off valve housing 28, and thereby is located inside the second end 42 of the second shut-off valve housing 28.

The valve member 232 of each shut-off valve in its valve open position extends across the first and second ends 36,38,40,42 of the corresponding shut-off valve housing 26,28. That is to say, the valve member 232 of each shut-off valve in its valve open position is located partly inside the hollow bore of the corresponding flexible hose 22,24 and partly outside the hollow bore of the corresponding flexible hose 22,24. Furthermore, the valve member 232 of each shut-off valve in its valve open position extends into the corresponding flexible hose 22,24 beyond the first end 36,40 of the corresponding shut-off valve housing 26,28. It is envisaged that, in other embodiments of the invention, the valve member 232 of each shut-off valve in its valve open position may remain inside the corresponding shut-off valve housing by changing the length of the corresponding first end and/or changing the position of the valve member.

The valve member 232 of each shut-off valve in its valve closed position is located completely inside the second end 38,42 of the corresponding shut-off valve housing 26,28.

Similarly, the configuration of the fluid conduit assembly 220 of FIG. 13 enables the construction of a breakaway coupling that has reduced size, weight and cost, improved handling during installation and post-separation, reduced risk of post-separation auto-submergence and additional protection, without adversely affecting the breakaway coupling's capability to block the flow of the flowable material through the hollow bore upon separation of the shut-off valve housings 26,28.

The arrangement of each pivot shaft and each valve member in the corresponding shut-off valve housing may be modified depending on the structure and operation of each pivot shaft and each valve member.

It is envisaged that, in other embodiments of the invention, the pivot shaft of each shut-off valve may be pivotally mounted to the inner wall of the second end of the corresponding shut-off valve housing. In such embodiments, the valve member of each shut-off valve in its valve open position may extend across the first and second ends of the corresponding shut-off valve housing or may be located completely inside the second end of the corresponding shut-off valve housing. In further such embodiments, the valve member of each shut-off valve in its valve closed position may be located completely inside the second end of the corresponding shut-off valve housing.

It is envisaged that, in still other embodiments of the invention, the pivot shaft of each shut-off valve may be pivotally mounted to the inner walls of the first and second ends of the corresponding shut-off valve housing. In such embodiments, the valve member of each shut-off valve in its valve open position may extend across the first and second ends of the corresponding shut-off valve housing. In further such embodiments, the valve member of each shut-off valve in its valve closed position may be located completely inside the second end of the corresponding shut-off valve housing, or may extend across the first and second ends of the corresponding shut-off valve housing.

In still other embodiments of the invention, it is envisaged that the breakaway coupling may include only one of the shut-off valves, with the single shut-off valve being located in one of the shut-off valve housings. In such embodiments, a separate mechanism may be used to oppose the movement of the valve member of the single shut-off valve in order to maintain the valve member in its valve open position when the shut-off valve housings are secured to each other.

In the embodiment shown, each of the first ends 36,40 has a straight tapered bore profile that tapers in a direction towards the corresponding second end 38,42. The straight tapered bore profile defines a section of a hollow bore of the corresponding first end 36,40 that is furthest inside the hollow bore of the corresponding flexible hose 22,24, i.e, the section of the hollow bore of the corresponding first end 36,40 that is furthest away from the corresponding second end 38,42. In other embodiments of the invention, the straight tapered bore profile may be replaced by a curved tapered bore profile, a straight bore profile or another bore profile, examples of which are described throughout the specification.

Other optional features of the fluid conduit assemblies 20,220 of the invention are described as follows.

In embodiments of the invention, one of the first and second shut-off valve housings may be the upstream shut-off valve housing, and the other of the first and second shut-off valve housings may be the downstream shut-off valve housing.

It is envisaged that, in other embodiments of the invention, the shut-off valve arrangement may be replaced by other shut-off valve arrangements, including a sleeve-based valve arrangement (such as described in GB 2391051 A).

It is also envisaged that, in still other embodiments of the invention, only one of the first ends of the shut-off valve housings extends inside the hollow bore of the corresponding flexible hose, and the other of the first ends of the shut-off valve housings is located outside the hollow bore of the corresponding flexible hose.

Optionally the shut-off valve housings may be indirectly secured to each other. For example, the breakaway coupling may further include an intermediate housing section, such as a collar, arranged between the shut-off valve housings, where the shut-off valve housings are secured to each other via the intermediate housing section.

Additionally or alternatively to the use of the frangible elements, the releasable fasteners may be configured to permit controlled separation of the shut-off valve housings from each other on operation of an actuation mechanism (e.g. a hydraulic or pneumatic actuation mechanism) operably engaged with each releasable fastener.

It is envisaged that the actuation mechanism could be operated remotely from a ship or shore-based control room. It is also envisaged that each hydraulic actuator may include a stab plate or a tail hose to enable remote operation of the actuation mechanism. The actuation mechanism could, for example, be operated when personnel and/or sensors determine that installation, maintenance, repair, servicing or transport of the breakaway coupling is required or has been completed.

It is also envisaged that the actuation mechanism could be operated locally, e.g. by using a local control unit in the vicinity of the actuation mechanism. The local control unit may include a hydraulic power unit (or a pneumatic power unit as the case may be). The local control unit may be sized to be portable, e.g. like a briefcase, so that it can be easily carried by a human operator.

In addition, the provision of the actuation mechanism to aid in the engagement and disengagement of the releasable fasteners is particularly beneficial when it is difficult to access each releasable fastener, e.g. due to the location of the breakaway coupling along the fluid conduit assembly 20,220.

The invention is also applicable for use with rigid fluid conduits, such as pipeline sections. It is envisaged that, in other embodiments of the invention, each of the first and second fluid conduits may be a rigid fluid conduit, or one of the first and second fluid conduits may be a flexible fluid conduit and the other of the first and second fluid conduits may be a rigid fluid conduit.

It will be appreciated that the numerical values used to describe the above embodiments are merely intended to help illustrate the working of the invention and are not intended to be limiting on the scope of the invention.

The listing or discussion of a prior-published document in this specification should not necessarily be taken as an acknowledgment that the document is part of the state of the art or is common general knowledge.

The invention claimed is:

1. A fluid conduit assembly comprising:
   first and second fluid conduits;
   a coupling including first and second coupling sections, each coupling section defining a respective hollow bore along which flowable material may flow, the first coupling section in fluid connection with the first fluid conduit, the second coupling section in fluid connection with the second fluid conduit, the coupling sections configured to be releasably coupled to each other; and at least one shut-off valve located within the hollow bore of at least one of the coupling sections, the or each shut-off valve including a valve member movable between a valve open position and a valve closed position in which the valve member shuts off the flo (/=w of a flowable material through the hollow bore, the or each valve member configured to move to its valve closed position on separation of the coupling sections, wherein the first coupling section is connected to the first fluid conduit so that a first end of the first coupling section extends inside a hollow bore of the first fluid conduit along which flowable material may flow and a second end of the first coupling section is located outside the hollow bore of the first fluid conduit, and/or wherein the second coupling section is connected to the second fluid conduit so that a first end of the second coupling section extends inside a hollow bore of the second fluid conduit along which flowable material may flow and a second end of the second coupling section is located outside the hollow bore of the second fluid conduit, wherein the or each first end has a tapered bore profile that tapers from an interior surface of the hollow bore of the first and/or second fluid conduit along which flowable material may flow in a direction towards the corresponding second end, wherein the tapered bore profile defines a section of a hollow bore of the corresponding first end that is furthest inside the hollow bore of the corresponding fluid conduit; and wherein the or each second end of the first coupling section and/or second coupling section includes a flange to be secured to a flange of the corresponding fluid conduit to secure the first coupling section and/or second coupling section to the corresponding fluid conduit and support the corresponding first end to extend in the corresponding fluid conduit.

2. The fluid conduit assembly according to claim 1 wherein the tapered bore profile is a straight tapered bore profile.

3. The fluid conduit assembly according to claim 1 wherein the tapered bore profile is a curved tapered bore profile.

4. The fluid conduit assembly according to claim 3 wherein the curved tapered bore profile is a convex tapered bore profile.

5. The fluid conduit assembly according to claim 3 wherein the coupling has a continuous, smooth bore profile that extends or substantially extends throughout the hollow bores of the coupling sections.

6. The fluid conduit assembly according to claim 1 wherein each of the first and second coupling sections includes a respective first end, and an axial length of the tapered bore profile of the first end of one of the first and second coupling sections is shorter than an axial length of the tapered bore profile of the first end of the other of the first and second coupling sections.

7. The fluid conduit assembly according to claim 6 wherein one of the first and second coupling sections is configured as an upstream coupling section, the other of the first and second coupling sections is configured as a downstream coupling section, and an axial length of the tapered bore profile of the first end of the upstream coupling section is shorter than an axial length of the tapered bore profile of the first end of the downstream coupling section.

8. The fluid conduit assembly according to claim 1 wherein each of the first and second coupling sections includes a respective first end, one of the first and second coupling sections is configured as an upstream coupling section, the other of the first and second coupling sections is configured as a downstream coupling section, and a width of a hollow bore of the first end of the upstream coupling section is larger than a width of a hollow bore of the first end of the downstream coupling section.

9. The fluid conduit assembly according to claim 1 wherein the or each valve member in its valve open position is located in any one of: the first end of the corresponding coupling section; the second end of the corresponding coupling section; and both of the first and second ends of the corresponding coupling section.

10. The fluid conduit assembly according to claim 1 wherein the or each valve member in its valve open position is located in any one of: the first end of the corresponding coupling section; and both of the first and second ends of the corresponding coupling section, and wherein at least part of the or each valve member in its valve open position extends into the corresponding fluid conduit beyond the first end of the corresponding coupling section.

11. The fluid conduit assembly according to claim 1 wherein the or each valve member in its valve closed position is located in any one of: the first end of the corresponding coupling section; the second end of the corresponding coupling section; and both of the first and second ends of the corresponding coupling section.

12. The fluid conduit assembly according to claim 1 wherein the or each shut-off valve includes a pivot member pivotally mounted to the corresponding coupling section, the valve member of the or each shut-off valve being pivotally movable relative to the hollow bore of the corresponding coupling section via the corresponding pivot member, and wherein the or each shut-off valve includes a plurality of petal elements, each petal element having a pivot member and a valve member, the valve member of each petal element being pivotally movable relative to the hollow bore of the corresponding coupling section via the corresponding pivot member, each petal element being rotatable between a fully retracted position that corresponds to a valve open position of the corresponding shut-off valve and a fully extended position that corresponds to a valve closed position of the corresponding shut-off valve, the valve members configured so that, when the corresponding shut-off valve is in the valve closed position, the valve members abut one another to form a cone that faces or opposes a direction of flow of the flowable material, an apex of the cone defining a meeting point for the petal elements when the corresponding shut-off valve is in the valve closed position.

13. The fluid conduit assembly according to claim 1 wherein the flanges are secured together using at least one flange fastener.

14. The fluid conduit assembly according to claim 13 wherein the or each flange fastener includes:
a screw fastener;
a nut and bolt arrangement;
a collar for securing the flanges together; or
a clamping device for securing the flanges together.

15. The fluid conduit assembly according to claim 1 wherein the coupling sections are releasably coupled to each other via at least one releasable fastener, and wherein the or each releasable fastener includes:

a weakened portion that breaks on exposure to a tensile load exceeding a predetermined limit;

a collar for securing the coupling sections together; or a clamping device for securing the coupling sections together.

16. The fluid conduit assembly according to claim 1 wherein the coupling sections are releasably coupled to each other via at least one releasable fastener, and wherein the fluid conduit assembly includes an actuation mechanism operably engaged with the or each releasable fastener, wherein the or each releasable fastener is configured to permit controlled separation of the coupling sections from each other on operation of the actuation mechanism.

17. The fluid conduit assembly according to claim 16 wherein the actuation mechanism is a hydraulic or pneumatic actuation mechanism.

18. The fluid conduit assembly according to claim 1 wherein an outer wall of the or each first end is a non-threaded outer wall, a protrusion-free outer wall, a groove-free outer wall and/or a smooth outer wall.

\* \* \* \* \*